(12) United States Patent
Ohashi

(10) Patent No.: US 7,557,839 B2
(45) Date of Patent: Jul. 7, 2009

(54) ELECTRONIC IMAGING DEVICE AND MOBILE TERMINAL INCLUDING THE ELECTRONIC IMAGING DEVICE

(75) Inventor: Kazuyasu Ohashi, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 744 days.

(21) Appl. No.: 10/902,115

(22) Filed: Jul. 30, 2004

(65) Prior Publication Data
US 2005/0094002 A1 May 5, 2005

(30) Foreign Application Priority Data
Jul. 31, 2003 (JP) .............................. 2003-204865

(51) Int. Cl.
*H04N 5/262* (2006.01)
(52) U.S. Cl. .............................. 348/240.3; 348/240.99; 348/240.1; 348/362; 348/363; 348/368; 359/354; 359/676; 359/689
(58) Field of Classification Search ............ 348/240.99, 348/240.3, 368; 396/505
See application file for complete search history.

(56) References Cited

U.S. PATENT DOCUMENTS

| | | | |
|---|---|---|---|
| 5,153,779 A | 10/1992 | Ohashi | |
| 5,305,051 A * | 4/1994 | Irie et al. | ....................... 396/77 |
| 5,331,464 A | 7/1994 | Ito et al. | |
| 5,398,135 A | 3/1995 | Ohashi | |
| 5,576,891 A | 11/1996 | Ohashi | |
| 5,581,319 A | 12/1996 | Ohashi | |
| 5,617,254 A | 4/1997 | Ohashi | |
| 5,630,188 A | 5/1997 | Ohashi | |
| 5,687,401 A | 11/1997 | Kawamura et al. | |
| 5,710,669 A * | 1/1998 | Endo | ........................... 359/686 |
| 5,930,056 A | 7/1999 | Ohashi | |
| 5,969,878 A * | 10/1999 | Koizumi | ...................... 359/682 |
| 6,014,265 A * | 1/2000 | Kato et al. | ................... 359/686 |
| 6,055,114 A * | 4/2000 | Ohtake | ......................... 359/676 |
| 6,072,638 A * | 6/2000 | Enomoto | ..................... 359/692 |

(Continued)

FOREIGN PATENT DOCUMENTS

| | | |
|---|---|---|
| JP | 10-39214 | 2/1998 |
| JP | 2000-111798 | 4/2000 |
| JP | 2002-267930 | 9/2002 |
| JP | 2003-35868 | 2/2003 |
| JP | 2003-107348 | 4/2003 |

OTHER PUBLICATIONS

U.S. Appl. No. 11/582,329, filed Oct. 18, 2006, Ohashi.
U.S. Appl. No. 11/064,515, filed Feb. 24, 2005, Ohashi.
U.S. Appl. No. 10/902,115, filed Jul. 30, 2004, Ohashi.
U.S. Appl. No. 11/873,078, filed Oct. 16, 2007, Ohashi.

*Primary Examiner*—Tuan V Ho
*Assistant Examiner*—Cynthia Calderon
(74) *Attorney, Agent, or Firm*—Oblon, Spivak, McClelland, Maier & Neustadt, P.C.

(57) ABSTRACT

An electronic imaging device includes a zoom lens that includes a plurality of lens groups and an imaging element that converts an optical image formed by the zoom lens into an electric signal. The zoom lens includes at least a first lens group having a negative focal length and a second lens group having a positive focal length sequentially from an object side, and a diaphragm on the object side of the second lens group. The diaphragm includes a first diaphragm having an aperture size A and a second diaphragm having an aperture size B, where A is greater than B, and the diaphragm is controlled such that the first diaphragm is effective on a long focus end and the second diaphragm is effective on a short focus end.

16 Claims, 13 Drawing Sheets

U.S. PATENT DOCUMENTS

| | | | |
|---|---|---|---|
| 6,236,518 B1 * | 5/2001 | Enomoto | 359/692 |
| 6,353,506 B1 | 3/2002 | Ohashi | |
| 6,498,688 B2 * | 12/2002 | Shibayama | 359/689 |
| 6,525,885 B2 | 2/2003 | Ohashi | |
| 6,714,362 B2 * | 3/2004 | Nomura et al. | 359/739 |
| 6,718,132 B2 * | 4/2004 | Nishina | 396/72 |
| 6,835,006 B2 * | 12/2004 | Tanaka et al. | 396/349 |
| 7,230,771 B2 * | 6/2007 | Kuiper et al. | 359/665 |
| 2002/0060855 A1 | 5/2002 | Ohashi | |
| 2002/0101665 A1 | 8/2002 | Ohashi et al. | |
| 2002/0176177 A1 * | 11/2002 | Takatsuki | 359/691 |
| 2003/0174412 A1 * | 9/2003 | Noguchi | 359/694 |
| 2003/0210473 A1 | 11/2003 | Ohashi | |
| 2004/0004772 A1 | 1/2004 | Ohashi et al. | |
| 2004/0008420 A1 * | 1/2004 | Ohashi | 359/680 |
| 2005/0063070 A1 * | 3/2005 | Watanabe et al. | 359/689 |
| 2005/0094002 A1 | 5/2005 | Ohashi | |
| 2006/0098301 A1 * | 5/2006 | Miyajima | 359/686 |
| 2008/0062531 A1 * | 3/2008 | Kim et al. | 359/676 |
| 2008/0117527 A1 * | 5/2008 | Nuno et al. | 359/687 |

* cited by examiner

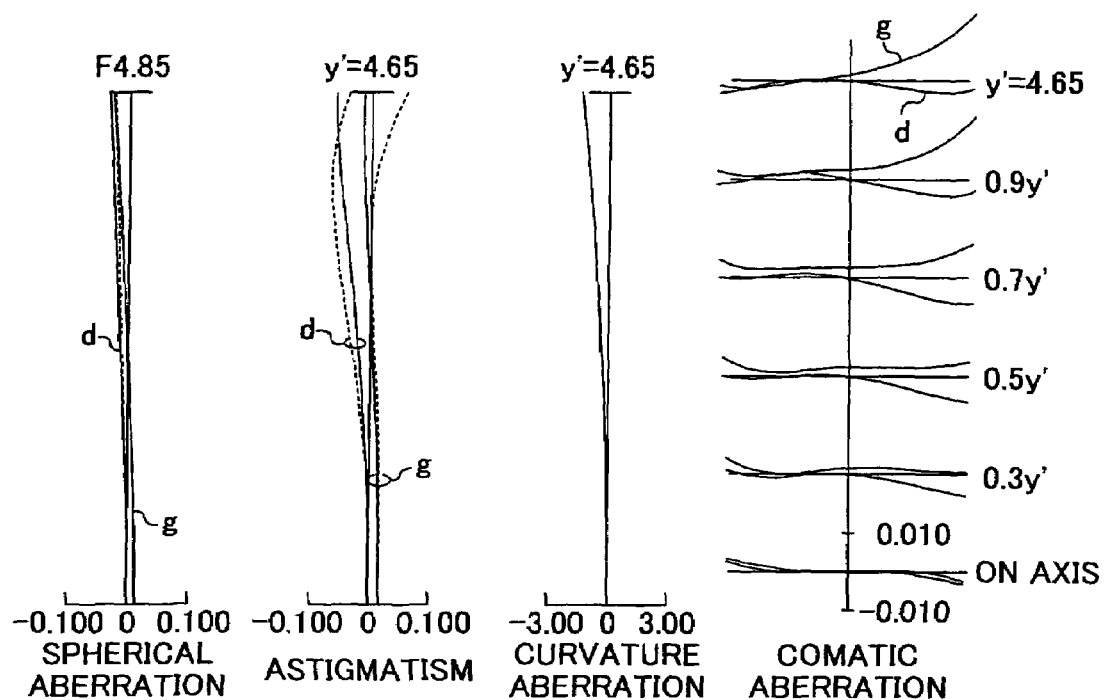
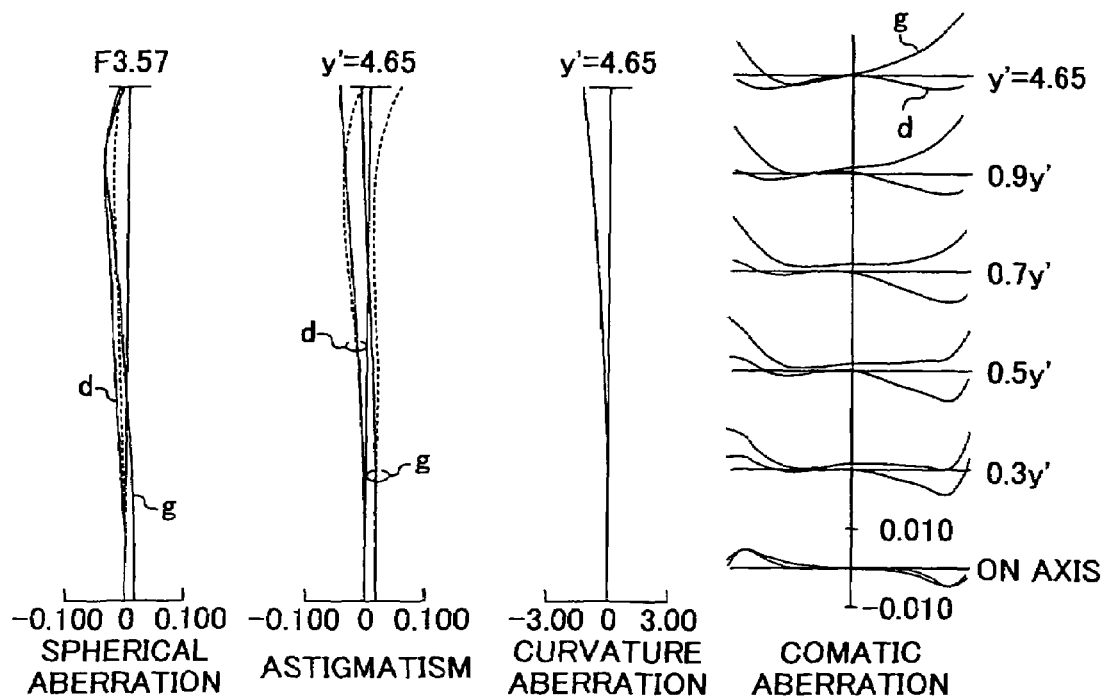

ELECTRONIC IMAGING DEVICE AND MOBILE TERMINAL INCLUDING THE ELECTRONIC IMAGING DEVICE

CROSS-REFERENCE TO RELATED APPLICATIONS

The present document incorporates by reference the entire contents of Japanese priority document, 2003-204865 filed in Japan on Jul. 31, 2003.

BACKGROUND OF THE INVENTION

1) Field of the Invention

The present invention relates to an electronic imaging device, such as a digital camera or a video camera, and a portable terminal device including the electronic imaging device.

2) Description of the Related Art

Recently, the digital camera market has remarkably grown, and users' requirements for the digital camera have diversified. In particular, an improvement in image quality and a reduction in size are always in the users' requirements of great importance. Accordingly, both the improvement in performance and the reduction in size are also required for a zoom lens employed as a photographic lens.

One of the zoom lenses that meet such requirements is a small-sized zoom lens including a first lens group having a negative focal length and a second lens group having a positive focal length from an object side, and including a diaphragm on the object side of the second lens group (see, for example, Japanese Patent Application Laid-Open No. H10-039214).

In terms of the reduction in size, it is necessary to reduce an entire lens length (a length from a lens surface nearest to the object side to an image surface). In terms of the improvement in performance, the lens needs to have a resolution corresponding to at least an imaging element having three million to six million pixels over entire zoom areas.

Many users also desire a wide angle of view for the photographic lens. A half angle of view on a short focus end of the zoom lens is desired to be 38 degrees or more. The half angle of view of 38 degrees corresponds to a focal length of 28 millimeters in terms of a 35-millimeter film camera. Users further strongly demand a high magnifying power exceeding three.

One of the zoom lenses suited particularly for the requirement of the reduction in size includes a first lens group having a negative focal length, a second lens group having a positive focal length, and a third lens group having a positive focal length from an object side, including a diaphragm on the object side of the second lens group, and if the magnification is changed from the a short focus end to a long focus end, the second lens group monotonously moves from the image side to the object side, and the first lens group moves to correct a fluctuation of a position of the image surface following the magnification (see, for example, Japanese Patent Application Laid-Open No. H10-039214, Japanese Patent Application Laid-Open No. 2002-267930, Japanese Patent Application Laid-Open No. 2000-111798, Japanese Patent Application Laid-Open No. 2003-107348, and Japanese Patent Application Laid-Open No. 2003-35868).

As the zoom lens of this type, a high magnification zoom lens having magnifying power lens groups intended to realize a high magnification is also known (see, for example, the Japanese Patent Application Laid-Open No. 2002-267930).

As the zoom lens of this type, a high image quality zoom lens intended to realize an improved angle of view is further known (see, for example, Japanese Patent Application Laid-Open No. 2000-111798, Japanese Patent Application Laid-Open No. 2003-107348, and Japanese Patent Application Laid-Open No. 2003-35868).

Despite its basic configuration, each of these small-sized zoom lenses does not always include sufficient constituent requirements to realize the reduction in size.

As the zoom lens of this type, there is also known one which has a variable power ratio of about 2.5, which has a simplified lens configuration by using aspherical surfaces for respective lens groups, and which has a relatively wide angle of view (see, for example, Japanese Patent Application Laid-Open No. 2000-111798). However, because of its variable power ratio of about 2.5, this zoom lens does not satisfy the requirement of the higher variable power.

As the zoom lens of this type, there is further known one which employs lenses as many as six in a second lens group, and which has a high variable power ratio of 3.8 (see, for example, Japanese Patent Application Laid-Open No. 2003-35868). However, since a half angle of view of this zoom lens is only about 31 degrees, the zoom lens does not satisfy the requirement of the wider angle of view. Besides, since the six lenses are employed in the second lens group, the size of this zoom lens is disadvantageously, eventually increased.

As the zoom lens, there is also known one which has a variable power ratio of 2.5 or less, and which satisfactorily realizes the wide angle of view and the reduction in size by designing the configuration of a second lens group that is a variable power group (see, for example, Japanese Patent Application Laid-Open No. 2003-35868). However, since the variable power ratio of this zoom lens is 2.5 or less, the zoom lens does not satisfy the requirement of the higher variable power.

There is also known a zoom lens which has a variable power ratio of 3 or less, which has a sufficiently wide angle of view, and which satisfactorily corrects aberrations (see, for example, Japanese Patent Application Laid-Open No. 2003-107348). However, since the variable power ratio of the zoom lens is 3 or less, this lens does not satisfy the requirement of the higher variable power.

In each of the conventional zoom lenses, a maximum aperture area of the diaphragm is substantially constant irrespective of a zoom position. A minimum F number on the short focus end is about 2.4 to 2.8, whereas that on the long focus end is about 4 to 5.3. The difference between the short focus end and the long focus end in minimum F number is therefore great. An excessively small F number on the long focus end disadvantageously makes it difficult to correct the aberrations, and causes the deterioration in image quality. An excessively large F number on the long focus end disadvantageously causes the deterioration in resolution due to a diffraction phenomenon.

SUMMARY OF THE INVENTION

It is an object of the present invention to solve at least the above problems in the conventional technology.

The electronic imaging device according to one aspect of the present invention includes a zoom lens that includes a plurality of lens groups, and changes a magnification by changing a distance between the lens groups, and an imaging element that converts an optical image formed by the zoom lens into an electric signal. The zoom lens includes at least a first lens group having a negative focal length and a second lens group having a positive focal length sequentially from an object side and a diaphragm on the object side of the second lens group. The diaphragm includes a first diaphragm having an aperture size A and a second diaphragm having an aperture size B, where A is greater than B, and the diaphragm is controlled in such a manner that the first diaphragm is effective on a long focus end of the zoom lens and the second diaphragm is effective on a short focus end of the zoom lens.

The electronic imaging device according to another aspect of the present invention includes a zoom lens that includes a plurality of lens groups, and changes a magnification by changing a distance between the lens groups, and an imaging element that converts an optical image formed by the zoom lens into an electric signal. The zoom lens includes at least a first lens group having a negative focal length and a second lens group having a positive focal length sequentially from an object side and a diaphragm on the object side of the second lens group. The diaphragm includes at least two discrete aperture sizes. The diaphragm is controlled so that a first maximum aperture size of the diaphragm on a long focus end is greater than a second maximum aperture size of the diaphragm on a short focus end, and following inequalities are satisfied $f_{Wmin} > 3.0$ $F_{max} < 11$ $0.25 < (S_W/S_T) < 0.75$ where $f_{Wmin}$ is a minimum F number on the short focus end, $F_{max}$ is a maximum F number in an entire magnification range, $S_W$ is the second maximum aperture size, and $S_T$ is the first maximum aperture size.

The mobile information terminal according to still another aspect of the present invention includes the electronic imaging device according to the above aspects.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 8 depicts aberration curves on a mean focal length of the zoom lens (a diaphragm diameter of which is equal to that on the short focus end) in the first numeric example;

FIG. 9 depicts aberration curves on the mean focal length of the zoom lens (a diaphragm diameter of which is equal to that on a long focus end) in the first numeric example;

DETAILED DESCRIPTION

Exemplary embodiments of an electronic imaging device and a mobile terminal including the electronic imaging device according to the present invention are explained in detail with reference to the accompanying drawings.

Figure 1A:
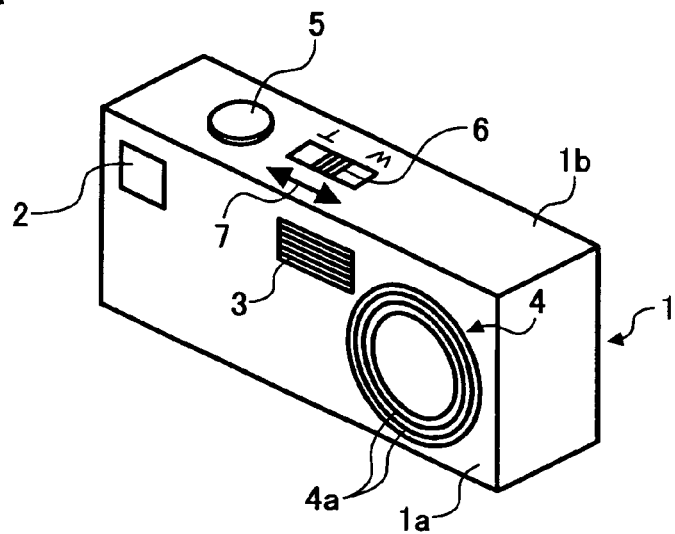
FIG. 1A is a perspective view of an electronic imaging device according to the present invention off from a front side.
Figure 1B:
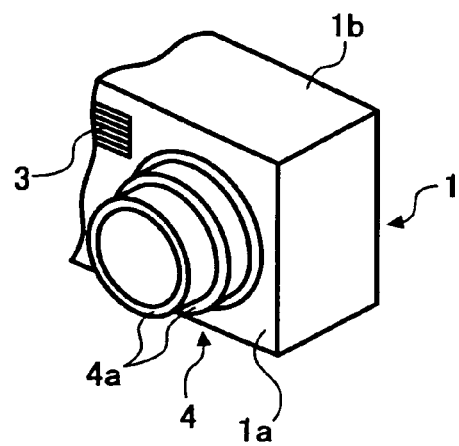
FIG. 1B is a partial perspective view of the electronic imaging device in a state in which a lens barrel of a zoom lens shown in FIG. 1A protrudes.
Figure 1C:
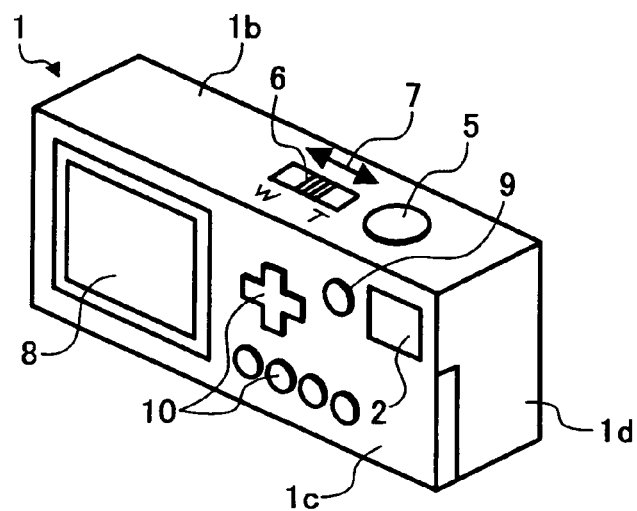
FIG. 1C is a perspective view of the electronic imaging device shown in FIG. 1A off from a rear side.

FIGS. 1A to 1C depict an electronic imaging device according to the present invention. In FIG. 1A, reference symbol 1 denotes a camera body that is a main body of the electronic imaging device, 2 denotes a finder provided in an upper right portion of the camera body 1, 3 denotes a flash provided in an upper central portion of a front surface 1a of the camera body 1, and 4 denotes a zoom lens which includes a plurality of lens groups, and which serves as a photographic lens that changes power by changing distances among the respective lens groups.

Reference symbol 5 denotes a shutter button provided on an upper surface 1b of the camera body 1, and 6 denotes a slide zoom lever provided on the upper surface 1b of the camera body 1. By operating this zoom lever 6 to slide sideways as indicated by an arrow 7, the zoom lever 6 slides between a short focus W (Wide) and a long focus T (Tele).

As shown in FIG. 1C, a liquid crystal monitor (displaying unit) 8, a power switch 9, and a plurality of operation buttons 10 are provided on a rear surface 1c of the camera body 1. A memory card slot 11 is provided on a side surface 1d of the camera body 1, and a memory (semiconductor memory) 11a shown in FIG. 2, that is, a memory card is inserted into this memory card slot 11.

Figure 2:
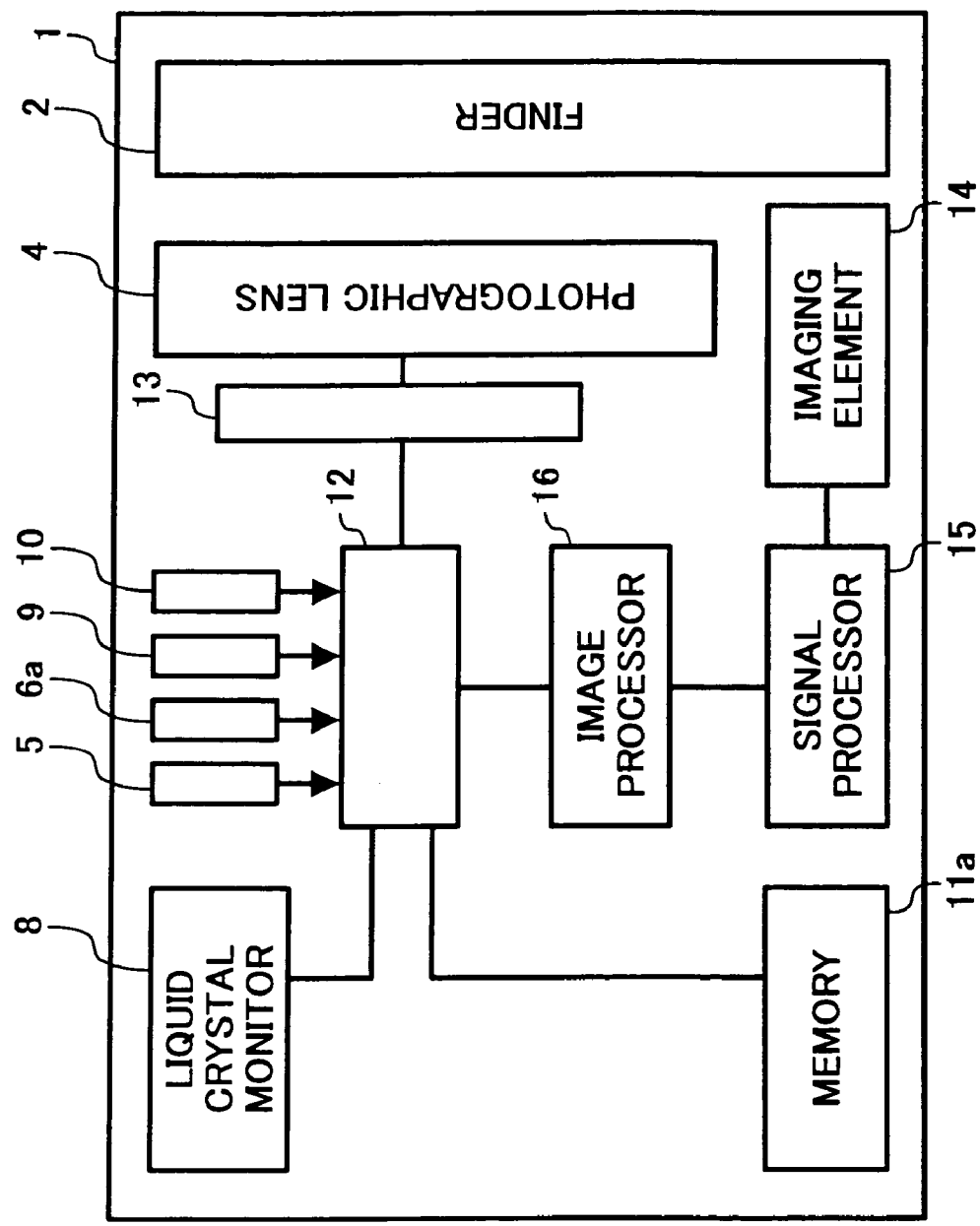
FIG. 2 depicts of an operational control circuit in the electronic imaging device shown in FIGS. 1A to 1C.

The liquid crystal monitor (displaying unit) 8 is controlled to operate by an operational control circuit 12 that includes a central processing unit (CPU) shown in FIG. 2. A switch 6a operated by the slide lever 6, the power switch 9, and the operation buttons 10 are connected to this operational control circuit 12. The memory (semiconductor memory) 11a detachably inserted into the memory card slot 11 is connected to the operational control circuit 12. Switches 5a and 5b operated by the shutter button 5 are also connected to the operational control circuit 9. By half-depression of this shutter button 5, the switch 5a is turned on, and the operational control circuit 9 controls focusing. By forward-depression of the shutter button 5, the switch 5b is turned on, and the operational control circuit 12 executes photographing. Since well-known configuration can be adopted for the operational control circuit 12, the configuration will not be explained herein in detail.

The operational control circuit 12 extends and contracts a lens barrel 4a of the zoom lens 4 by a drive 13 such as a pulse motor or an ultrasonic motor.

An imaging element 14 such as a charge coupled device (CCD) which forms a subject image by a luminous flux guided by the zoom lens 4 is provided within the camera body 1. This imaging element 14 converts an optical image formed by the zoom lens 4 into an electric signal.

The electric signal output from this imaging element 14 is input to the operational control circuit 12 through a signal processor 15 and an image processor 16. The operational control circuit 12 displays the image signal output from the image processor 16 on the liquid crystal monitor 8.

Figure 3:
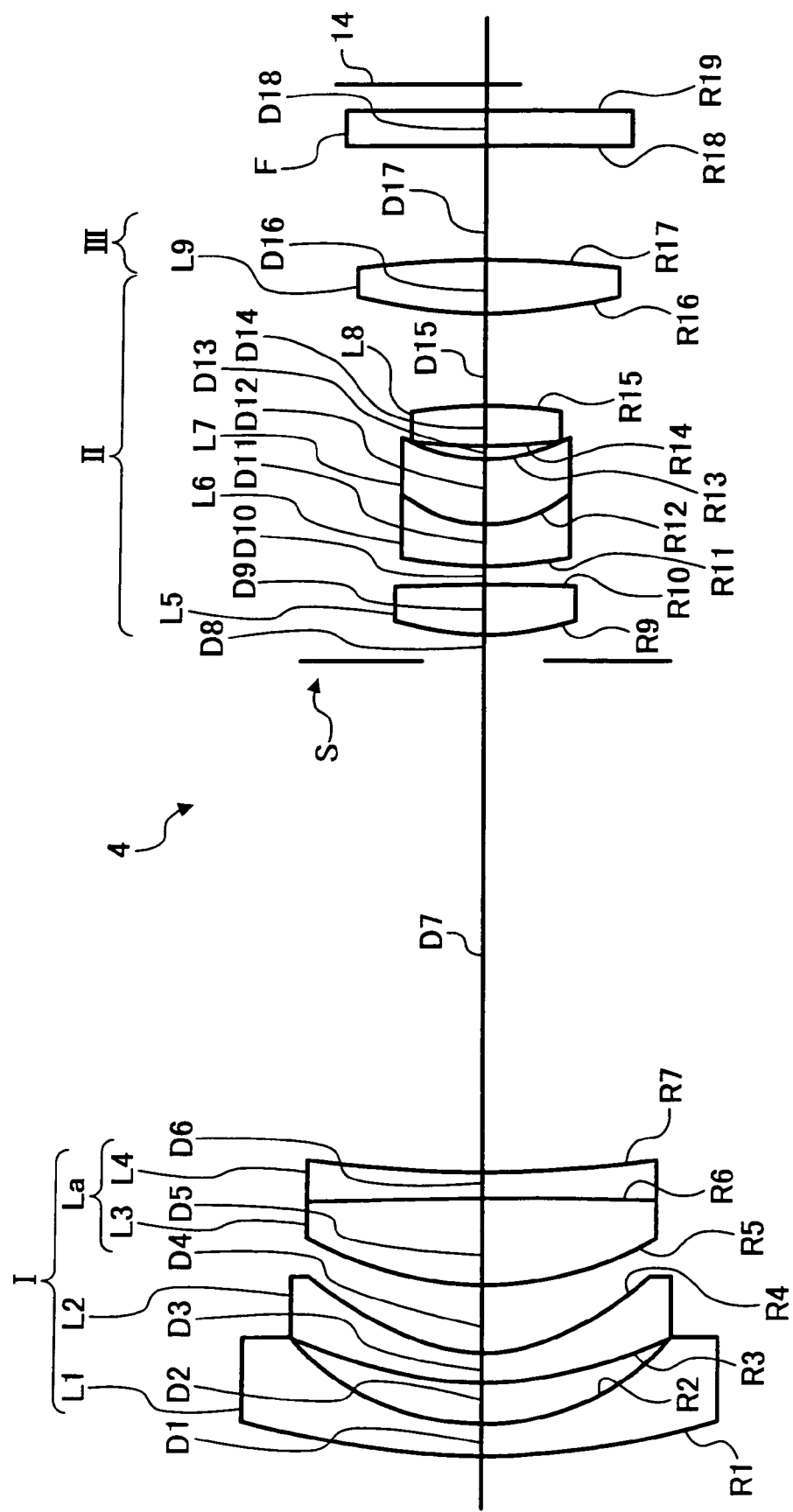
FIG. 3 is a cross-sectional view of the configuration of the zoom lens in the electronic imaging device shown in FIGS. 1A to 1C.

As shown in FIG. 3, the zoom lens 4 includes a first lens group (first lens group) I having a negative focal length, a second lens group (second lens group) II having a positive focal length, a third lens group (third lens group) III, and a filter F from an object side in this order. The zoom lens 4 also includes a diaphragm unit (diaphragm) S located on the object side of the second lens group II and moving in an optical axis direction integrally with the second lens group II.

The first lens group I includes a first lens L1 which is a negative lens, a second lens L2 which is a negative lens, a third lens L3 which is a positive lens, and a fourth lens L4 which is a negative lens arranged in this order. The third lens L3 and the fourth lens L4 are bonded together and integrated into one lens La.

The second lens group II includes a fifth lens L5 which is a positive lens, a sixth lens L6 and a seventh lens L7 which are negative lenses, and an eighth lens L8 which is a positive lens. The sixth lens L6 and the seventh lens L7 are bonded together and integrated into one lens Lb. The third lens group III includes a ninth lens L9 which is a positive lens.

In FIG. 3, reference symbol R1 denotes a front refracting surface of the first lens L1, and R2 denotes a rear refracting surface thereof. R3 denotes a front refracting surface of the second lens L2, and R4 denotes a rear refracting surface thereof. R5 denotes a front refracting surface of the third lens L3, R6 denotes bonded surfaces (refracting surfaces) of the third lens L3 and the fourth lens L4, and R7 denotes a rear refracting surface of the fourth lens L4. R9 denotes a front refracting surface of the fifth lens L5, and R10 denotes a rear refracting surface thereof. R11 denotes a front refracting surface of the sixth lens L6, R12 denotes bonded surfaces (refracting surfaces) of the sixth lens L6 and the seventh lens L7, and R13 denotes a rear refracting surface of the seventh lens L7. R14 denotes a front refracting surface of the eighth lens L8, and R15 denotes a rear refracting surface thereof. R16 denotes a front refracting surface of the ninth lens L9, and R17 denotes a rear refracting surface thereof. R18 denotes a front surface of the filter F, and R19 denotes a rear surface thereof.

Reference symbol D1 denotes a distance between the refracting surfaces R1 and R2 of the first lens L1, and D2 denotes a distance between the refracting surface R2 of the first lens L1 and the refracting surface R3 of the second lens L2. D3 denotes a distance between the refracting surfaces R3 and R4 of the second lens L2, and D4 denotes a distance between the refracting surface R4 of the second lens L2 and the refracting surface R5 of the third lens L3. D5 denotes a distance between the refracting surface R5 of the fourth lens L4 and the bonded surfaces (refracting surfaces) R6 of the third lens L3 and the fourth lens L4. D6 denotes a distance between the bonded surfaces (refracting surfaces) R6 of the third lens L3 and the fourth lens L4 and the refracting surface R7 of the fourth lens L4.

Reference symbol D7 denotes a distance between the refracting surface R7 of the fourth lens L4 and the diaphragm unit S, and D8 denotes a distance between the diaphragm unit S and the refracting surface R9 of the fifth lens L5.

Reference symbol D9 denotes a distance between the refracting surfaces R9 and R10 of the fifth lens L5, and D10 denotes a distance between the refracting surface R10 of the fifth lens L5 and the refracting surface R11 of the sixth lens L6. D11 denotes a distance between the refracting surface R11 of the sixth lens L6 and the bonded surfaces (refracting surfaces) R12 of the sixth lens L6 and the seventh lens L7. D12 denotes a distance between the bonded surfaces (refracting surfaces) R12 of the sixth lens L6 and the seventh lens L7 and the refracting surface R13 of the seventh lens L7. D13 denotes a distance between the refracting surface R13 of the seventh lens L7 and the refracting surface R14 of the eighth lens L8, and D14 denotes a distance between the refracting surfaces R14 and R15 of the eighth lens L8.

Reference symbol D15 denotes a distance between the refracting surface R15 of the eighth lens L8 and the refracting surface R16 of the ninth lens L9. D16 denotes a distance between the refracting surfaces R16 and R17 of the ninth lens L9, and D17 denotes a distance between the refracting surface R17 of the ninth lens L9 and the refracting surface (front surface) R18 of the filter F. D18 denotes a distance between the refracting surface (front surface) R18 and the refracting surface (rear surface) R19 of the filter F.

Figure 4A:
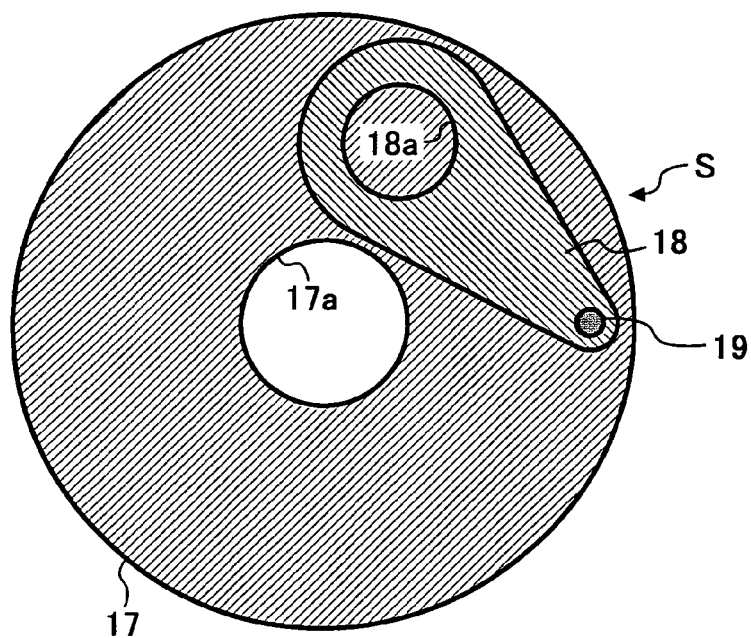
FIG. 4A is a plan view of a diaphragm unit shown in FIG. 3.
Figure 4B:
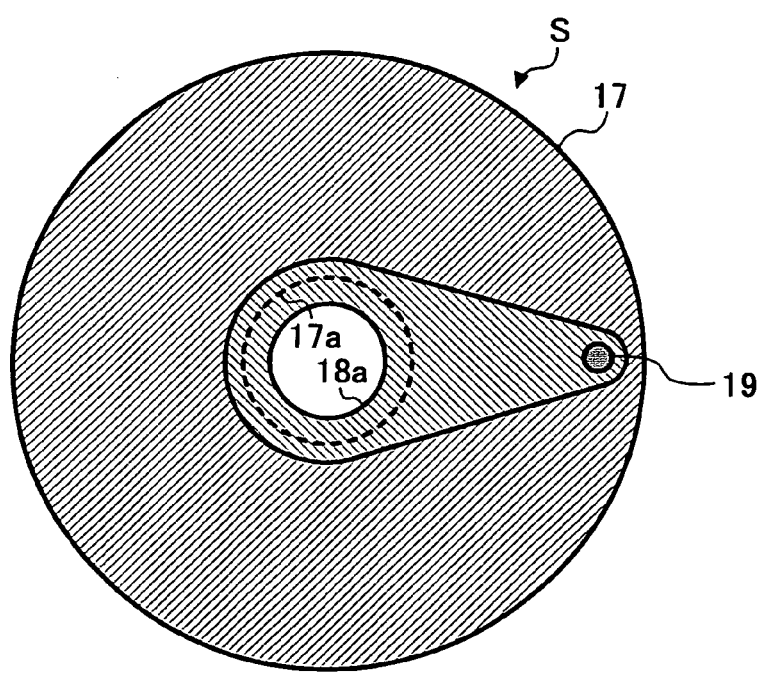
FIG. 4B is an explanatory view for a function of the diaphragm unit shown in FIG. 4A.

The diaphragm unit (diaphragm) S serving as a diaphragm mechanism includes a first diaphragm plate (diaphragm A) 17 that includes a diaphragm hole 17a, and a second diaphragm plate (diaphragm B) 8 that includes a diaphragm hole 18a on a tip end, as shown in FIGS. 4A and 4B. An aperture area $S_A$ of the diaphragm hole 17a is set larger than an aperture area $S_B$ of the diaphragm hole 18a. A proximal end of the second diaphragm plate 18 is rotatably held by the first diaphragm plate 17 so that the second diaphragm plate 18 rotates around a support shaft 19. The first diaphragm plate (diaphragm A) 17 is constantly provided on an optical path, and a center of the diaphragm hole 17a of the first diaphragm plate (diaphragm A) 17 is set aligned to an optical axis of the zoom lens 4.

As shown in FIG. 4A, if the tip end of the second diaphragm plate 18 retreats from the diaphragm hole 17a, the diaphragm hole 17a of the first diaphragm plate 17 is stopped down to converge the luminous flux on the optical path. As shown in FIG. 4B, if the tip end of the second diaphragm plate 18 covers a peripheral edge of the diaphragm hole 17a and the diaphragm hole 18a of the second diaphragm plate 18 is concentric with the diaphragm hole 17a, the diaphragm hole 18a of the second diaphragm plate 18 is stopped down to converge the luminous flux on the optical path.

Accordingly, the diaphragm unit (diaphragm) S of the electronic imaging device is capable of selecting one of two discrete aperture areas (diaphragms A and B). This second diaphragm plate 18 is located on or off the optical path of the zoom lens 4 by a cam mechanism operating successively with a zoom operation of the zoom lens 4. It is thereby possible to switch over a state of the second diaphragm plate 18 to one of a state shown in FIG. 4A and a state shown in FIG. 4B. Alternatively, the second diaphragm plate 18 can be driven by a simple actuator such as an electromagnetic plunger, and the state of the second diaphragm plate 18 can be switched over to one of the state shown in FIG. 4A and the state shown in FIG. 4B.

As explained, the diaphragm unit (diaphragm) S includes the diaphragms A and B, and the aperture area $S_A$ of the diaphragm A is set larger than the aperture area $S_B$ of the diaphragm B. An aperture of the diaphragm unit S is controlled so that the diaphragm B is effective on the short focus (Wide) end of the zoom lens 4, and so that the diaphragm A is effective on the long focus (Tele) end of the zoom lens 4.

The imaging element (area sensor) 14 converts the optical image formed by the zoom lens 4 serving as the photographic lens into the electric signal.

An output of this imaging element 14 is converted into digital image information by the signal processor 15 which is controlled by the operational control circuit 12 that includes the CPU. The image information digitized by the signal processor 15 is subjected to a predetermined image processing by the image processor 16 controlled by the operational control circuit 12, and then recorded in the memory 11a. The liquid crystal display monitor 8 can display both the image which is being photographed and the image recorded in the memory 11a.

As shown in FIG. 1A, when a user carries a camera, the photographic lens 4 is collapsed. As shown in FIG. 1B, when the user operates the power switch 9 to turn on the camera, the lens barrel 4a is extended. At this time, in the lens barrel 4a, the groups I, II, and II of the zoom lens 4 are arranged on, for example, the short focus end. By operating the zoom lever 6 to a long focus side, the arrangement of the respective groups I, II, and III changes, and the power of the zoom lens 4 can be changed to the long focus end. It is noted that a power of the finder 2 is changed successively with a change in the angle of view of the photographic lens.

Further, by half-depression of the shutter button 5, the switch 5a is turned on and focusing is made. At the same time, a white balance and an exposure are determined. During this time, the change of the diaphragm or the insertion or separation of a neutral density (ND) filter is often carried out so as to control a quantity of light reaching the imaging element 14. By further depression of the shutter button 5, the switch 5b is turned on and photographing is performed, followed by the processing already explained.

Figure 5:
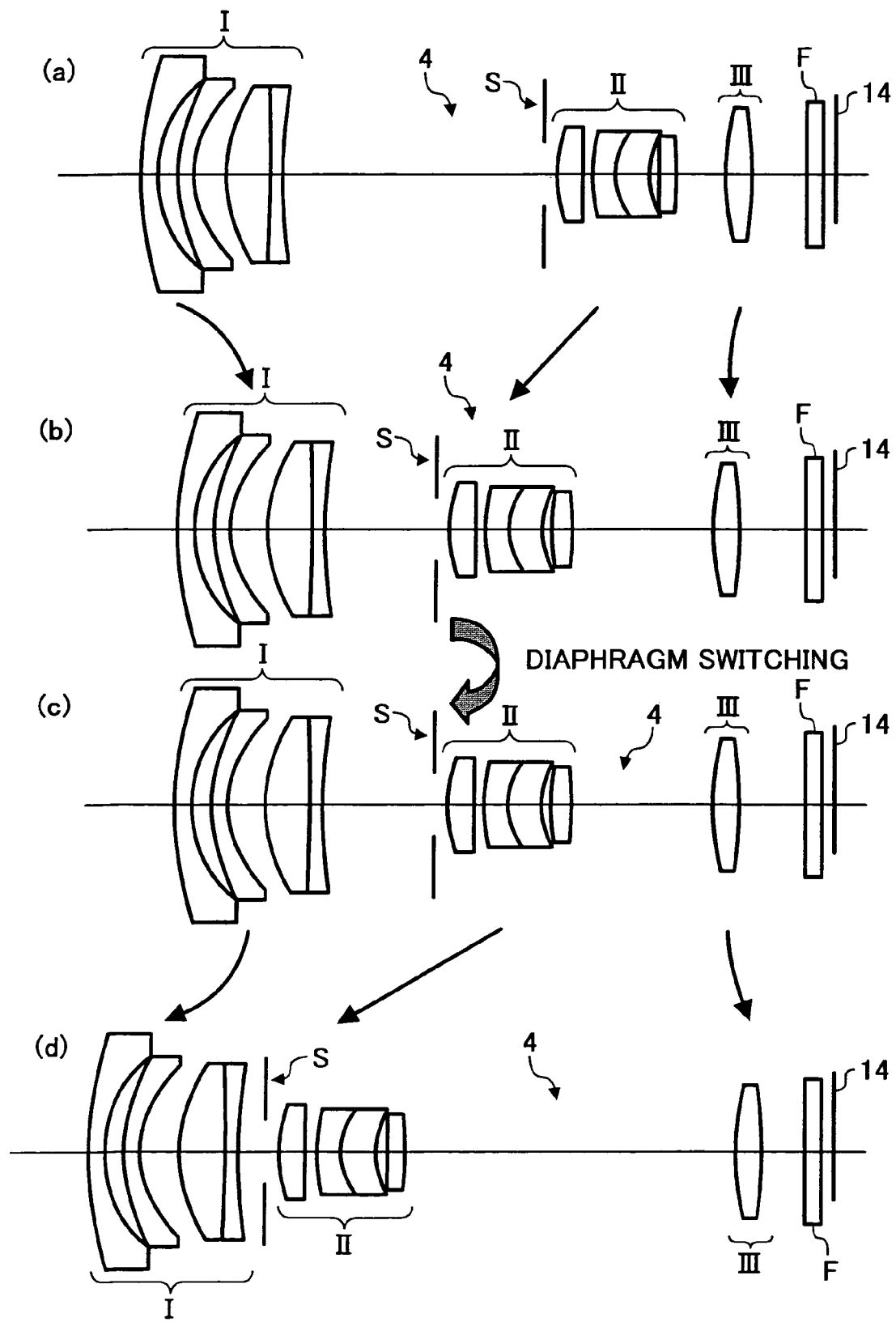
FIGS. 5A to 5D are explanatory views for a function of the zoom lens shown in FIG. 3.

The operational control circuit 12 controls the lens groups (the first to the third lens groups I to III) to operate from the state shown in FIG. 5A to the state shown in FIG. 5D, and changes the aperture area of the diaphragm unit S.

In FIG. 5A, the zoom lens 4 is located on the short focus (Wide) end. While the tip end of the second diaphragm plate 18 covers the peripheral edge of the diaphragm hole 17a as shown in FIG. 4B, and the diaphragm hole 18a of the second diaphragm plate 18 is concentric with the diaphragm hole 17a, the diaphragm hole 18a of the second diaphragm plate 18 is stopped down to converge the luminous flux. At this position, the diaphragm unit S selects the diaphragm B (B<A), and has the aperture area $S_B$ ($S_B < S_A$).

In this state, if the zoom lever 6 is controlled to slide from the short focus W (Wide) side to the long focus T (Tele) side, the operational control circuit 12 contracts the lens barrel 4a of the zoom lens 4 using the drive 13, and moves the first lens group I from the state shown in FIG. 5A to the state shown in FIG. 5B, that is to the second lens group II side. At this time, the second lens group II and the diaphragm unit S are moved integrally by a cam mechanism or the like, not shown, from the state shown in FIG. 5A in which the second lens group II and the diaphragm unit S are located on the short focus (Wide) end to the first lens group I-side shown in FIG. 5B. Further, the third lens group III is moved by a lead screw mechanism in a direction in which the third lens group III is slightly separated from the filter F. Since a well-known structure can be adopted for this lead screw mechanism, the lead screw mechanism will not be explained herein in detail.

After the second lens group II is moved to the position shown in FIG. 5B, the second diaphragm plate 18 of the diaphragm unit S is rotated around the support shaft 19 so that the second diaphragm plate 18 retreats from the diaphragm hole 17a of the first diaphragm plate 17. The rotation of the second diaphragm plate 18 can be similarly, automatically executed by the cam mechanism, not shown.

If the second diaphragm plate 18 of the diaphragm unit S is caused to retreat from the diaphragm hole 17a of the first diaphragm plate 17, the diaphragm of the diaphragm unit S is switched over as shown in FIG. 5B to FIG. 5C. Namely, the diaphragm is changed from the diaphragm B (B<A) to the diaphragm A, and the diaphragm unit S has the aperture area $S_A$ ($S_B < S_A$).

Thereafter, the operational control circuit 12 extends the lens barrel 4a of the zoom lens 4 using the drive 13, and moves the first lens group I in a direction in which the first lens group I as well as the second lens group II are separated from the third lens group III as shown in FIGS. 5C to 5D. At this time, the second lens group II and the diaphragm unit S are moved to the first lens group I side by the cam mechanism or the like, not shown, as shown in FIGS. 5C to 5D. The third lens group III is moved to the filter F side by the cam mechanism or the like, not shown, as shown in FIGS. 5C to 5D. Since a well-known structure can be adopted for this cam mechanism, the cam mechanism will not be explained herein in detail. In the state shown in FIG. 5D, the zoom lens 4 is located on the long focus (Tele) end, where the diaphragm A is effective.

If the zoom lever 6 is operated to slide from the long focus T (Tele) side to the short focus W (Wide) side, the operational control circuit 12 executes control as shown from FIG. 5D to FIG. 5A, opposite to the control operation explained above.

The diaphragm unit S includes the two diaphragm holes 17a and 18a, and can switch over the diaphragm between the two diaphragms A and B. However, the present invention is not necessarily limited to this configuration.

Figure 6:
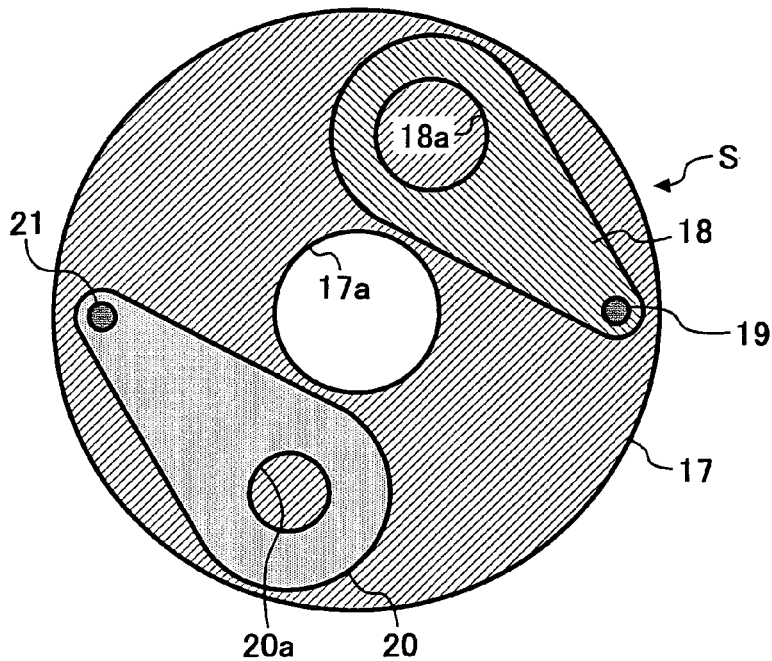
FIG. 6 is a plan view of a modification of the diaphragm unit shown in FIGS. 4A and 4B.

For example, in addition to the configuration shown in FIGS. 4A and 4B, the diaphragm unit S may include a third diaphragm plate (diaphragm C) 20 having a diaphragm hole 20a provided on a tip end, and a proximal end of the third diaphragm plate 20 may be rotatably attached to the first diaphragm plate 17 through a support shaft 21 as shown in FIG. 6. In this configuration, the diaphragm hole 20a is set smaller than the diaphragm hole 18a of the second diaphragm plate 18. Namely, an aperture area of the diaphragm hole 20a is set smaller than that of the diaphragm hole 18a of the second diaphragm plate 18. In other words, the diaphragm C is set smaller than the diaphragm B.

Similarly to the second diaphragm plate 17, this third diaphragm plate 20 may be located on or off the optical path of the zoom lens 4 by the cam mechanism operating successively with the zoom operation of the zoom lens 4. Alternatively, the third diaphragm plate 20 may be driven to be located on or off the optical path of the zoom lens 4 by the simple actuator such as an electromagnetic plunger, similarly to the second diaphragm plate 17.

A specific numerical example of the zoom lens 4 employed in the electronic imaging device according to the first embodiment of the present invention shown in FIGS. 3 to 6 will be explained. In this example, a maximum image height is 4.65 millimeters.

As shown in FIGS. 7 to 10, aberrations of the electronic imaging device in this example are sufficiently corrected, and the electronic imaging device can correspond to a light reception element of three to six million pixels. As is obvious from the first example, by thus constituting the electronic imaging device, it is possible to ensure a quite high image quality while attaining a sufficient reduction in size.

Meanings of symbols in this example are as follows.
f: Focal length of the whole system
F: F number
ω: Half angle of view (in degrees)
R: Radius of curvature
D: Surface distance
Nd: Refractive index
vd: Abbe number
K: Conic coefficient of aspherical surface
$A_4$: Fourth-degree aspherical coefficient
$A_6$: Sixth-degree aspherical coefficient
$A_8$: Eighth-degree aspherical coefficient
$A_{10}$: Tenth-degree aspherical coefficient
$A_{12}$: Twelfth-degree aspherical coefficient
$A_{14}$: Fourteenth-degree aspherical coefficient
$A_{16}$: Sixteenth-degree aspherical coefficient
$A_{18}$: Eighteenth-degree aspherical coefficient where the "aspherical surface" mentioned herein is defined by the following equation if a reciprocal (paraxial curvature) of a paraxial radius of curvature is C and a height from the optical axis is H $$X = \frac{CH^2}{1+\sqrt{(1-(1+K)C^2H^2)}} + A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} + A_{18} \cdot H^{18} \quad (1)$$

It is noted that the numbers of the refracting surfaces each denoted by R plus number and those of the distance each denoted by D plus number correspond to the surface numbers shown in the Table 1.

TABLE 2

| | VARIABLE DISTANCE | | |
|---|---|---|---|
| | SHORT FOCUS END f = 5.97 | MEAN FOCAL LENGTH f = 11.25 | LONG FOCUS END f = 21.15 |
| A | 20.319 | 7.783 | 1.947 |
| B | 3.689 | 9.908 | 23.459 |
| C | 4.352 | 4.692 | 2.926 |

Open Diaphragm Diameter

Short focus end to mean focal length (switching point)
φ4.70

Mean focal length (switching point) to long focus end
φ6.40

TABLE 1

First numeric example
f = 5.97~21.15, F = 3.64~4.55 · 3.57-5.44, ω = 39.16~12.45

| SURFACE NUMBER | R | D | $N_d$ | $v_d$ | REMARKS | |
|---|---|---|---|---|---|---|
| 01 | 28.071 | 1.20 | 1.83400 | 37.34 | FIRST LENS | |
| 02 | 9.127 | 1.65 | | | | |
| 03 | 14.907 | 1.20 | 1.80610 | 40.74 | SECOND LENS | |
| 04* | 7.003 | 2.64 | | | | |
| | | | | | THIRD LENS | FIRST GROUP |
| 05 | 12.178 | 3.42 | 1.80518 | 25.46 | | |
| | | | | | FOURTH LENS | |
| 06 | −177.170 | 1.00 | 1.83400 | 37.34 | | |
| 07 | 36.115 | VARIABLE (A) | | | | |
| 08 | DIAPHRAGM | 1.00 | | | | |
| 09* | 9.325 | 1.96 | 1.80420 | 46.50 | FIFTH LENS | |
| 10 | 958.837 | 0.81 | | | | SECOND GROUP |
| 11 | 14.266 | 1.69 | 1.84666 | 23.78 | SIXTH LENS | |
| | | | | | SEVENTH LENS | |
| 12 | 5.000 | 2.58 | 1.69100 | 54.70 | | |
| 13 | 6.522 | 0.55 | | | | |
| | | | | | EIGHTH LENS | |
| 14 | 31.124 | 1.49 | 1.48749 | 70.44 | | THIRD GROUP |
| 15* | −28.355 | VARIABLE (B) | | | | |
| 16* | 21.273 | 2.06 | 1.51680 | 64.20 | NINTH LENS | |
| 17 | −50.734 | VARIABLE (C) | | | | |
| 18 | ∞ | 1.43 | 1.51680 | 64.20 | VARIOUS FILTERS | |
| 19 | ∞ | | | | | |

Aspherical surface: the fourth surfaces $K = 0.0, A_4 = -2.74941 \times 10^{-4}, A_6 = -5.96021 \times 10^{-6}, A_8 = 1.30880 \times 10^{-7}, A_{10} = -9.13094 \times 10^{-9}$
$A_{12} = 2.46942 \times 10^{-10}, A_{14} = -8.17608 \times 10^{-12}, A_{16} = 1.91779 \times 10^{-13}, A_{18} = -2.16482 \times 10^{-15}$ Aspherical surface: the ninth surface $K = 0.0, A_4 = -1.19782 \times 10^{-4}, A_6 = -8.77949 \times 10^{-7}, A_8 = 3.16974 \times 10^{-8}, A_{10} = -2.60476 \times 10^{-9}$ Aspherical surface: the fifteenth surface $K = 0.0, A_4 = 1.11643 \times 10^{-4}, A_6 = 1.91950 \times 10^{-7}, A_8 = -1.92037 \times 10^{-8}, A_{10} = 9.51534 \times 10^{-8}$ Aspherical surface: the sixteenth surface $K = 0.0, A_4 = 7.18417 \times 10^{-6}, A_6 = 2.14400 \times 10^{-6}, A_8 = -8.28991 \times 10^{-8}, A_{10} = 1.44842 \times 10^{-9}$ Numeric values of conditional equations $F_{WB} = 3.64$ $F_{max} = 5.44$ $(S_B/S_A) = 0.539$ $(f_c/(f_w \cdot f_T)^{1/2}) = 1.00$ In this first numeric example, the diaphragm A has a diameter of φ6.40, and the diaphragm B has a diameter of φ4.70. With the mean focal length as a switching point, in a short focus end-side focal length region in which the diaphragm B is effective, the F number is 3.64 to 4.85, and in a long focus end-side focal length region in which the diaphragm A is effective, the F number is 3.57 to 5.44.

In the long focus end-side focal length region, the diaphragm B can be inserted into the optical path. If the diaphragm B is inserted, the F number is 4.86 to 7.41.

If a diaphragm C having a diameter of φ3.20 is added and inserted into the optical path in the short focus end-side focal length region, the F number is 5.35 to 7.12.

Figure 7:
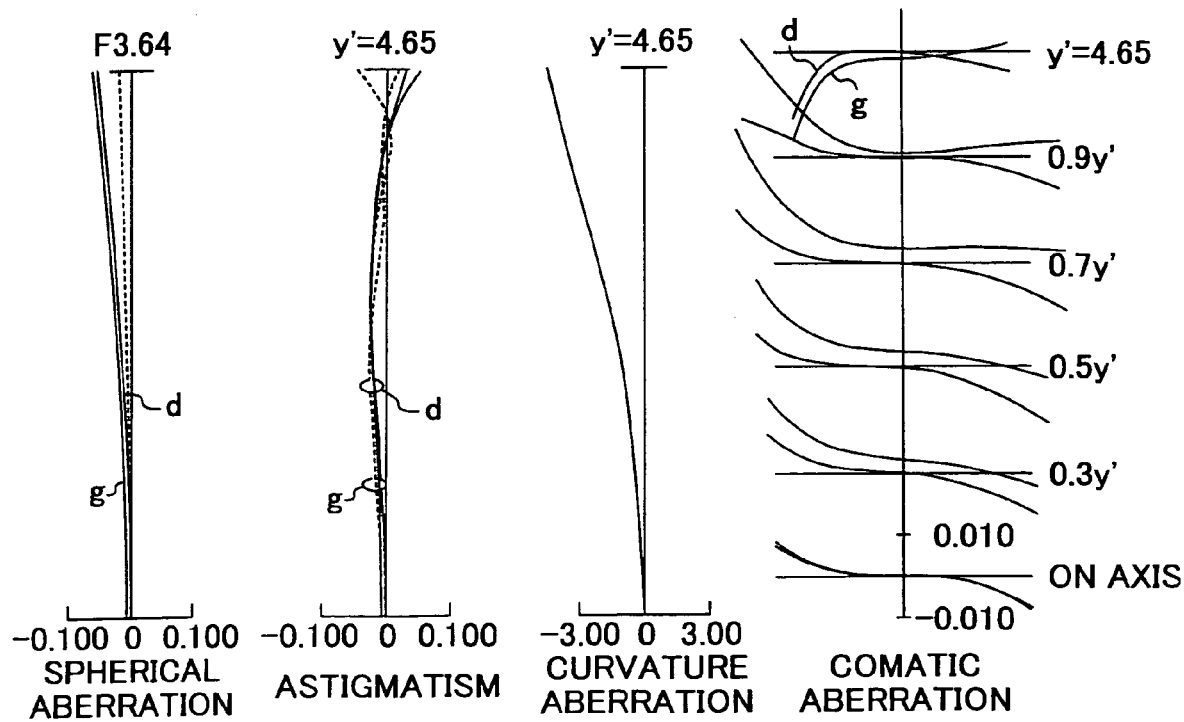
FIG. 7 depicts aberration curves on a short focus end of the zoom lens in a first numeric example.
Figure 10:
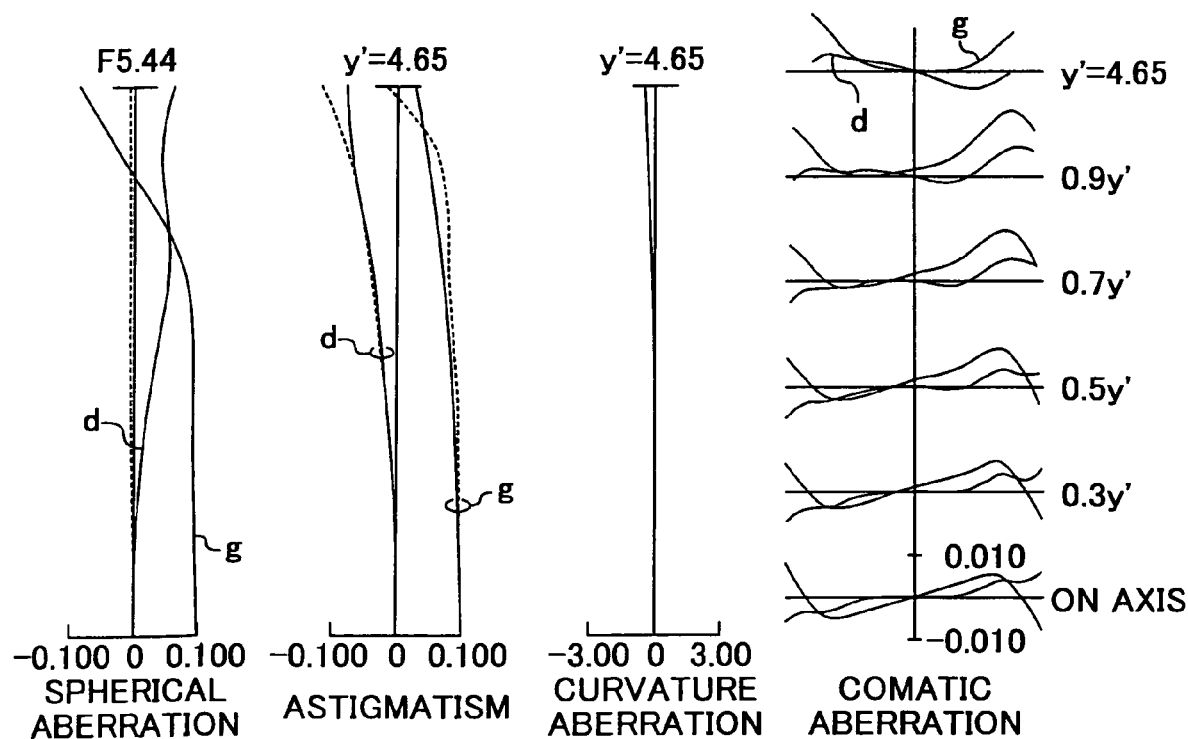
FIG. 10 depicts aberration curves on the long focus end of the zoom lens in the first numeric example.

With such lens configuration, aberrations shown in FIGS. 7 to 10 are obtained. FIG. 7 depicts aberration curves on the short focus end of the zoom lens in the first numeric example. FIG. 8 depicts aberration curves at the mean focal length of the zoom lens (the diaphragm diameter of which is equal to that on the short focus end) in the first numeric example. FIG. 9 depicts aberration curves at the mean focal length of the zoom lens (the diaphragm diameter of which is equal to that on the long focus end) in the first numeric example. FIG. 10 depicts aberration curves on the long focus end of the zoom lens in the first numeric example.

In FIGS. 7 to 10, a broken line for each spherical aberration denotes a sine condition, a solid line for each astigmatism denotes a sagittal ray, and a broken line for each astigmatism denotes a meridional ray.

Figure 11:
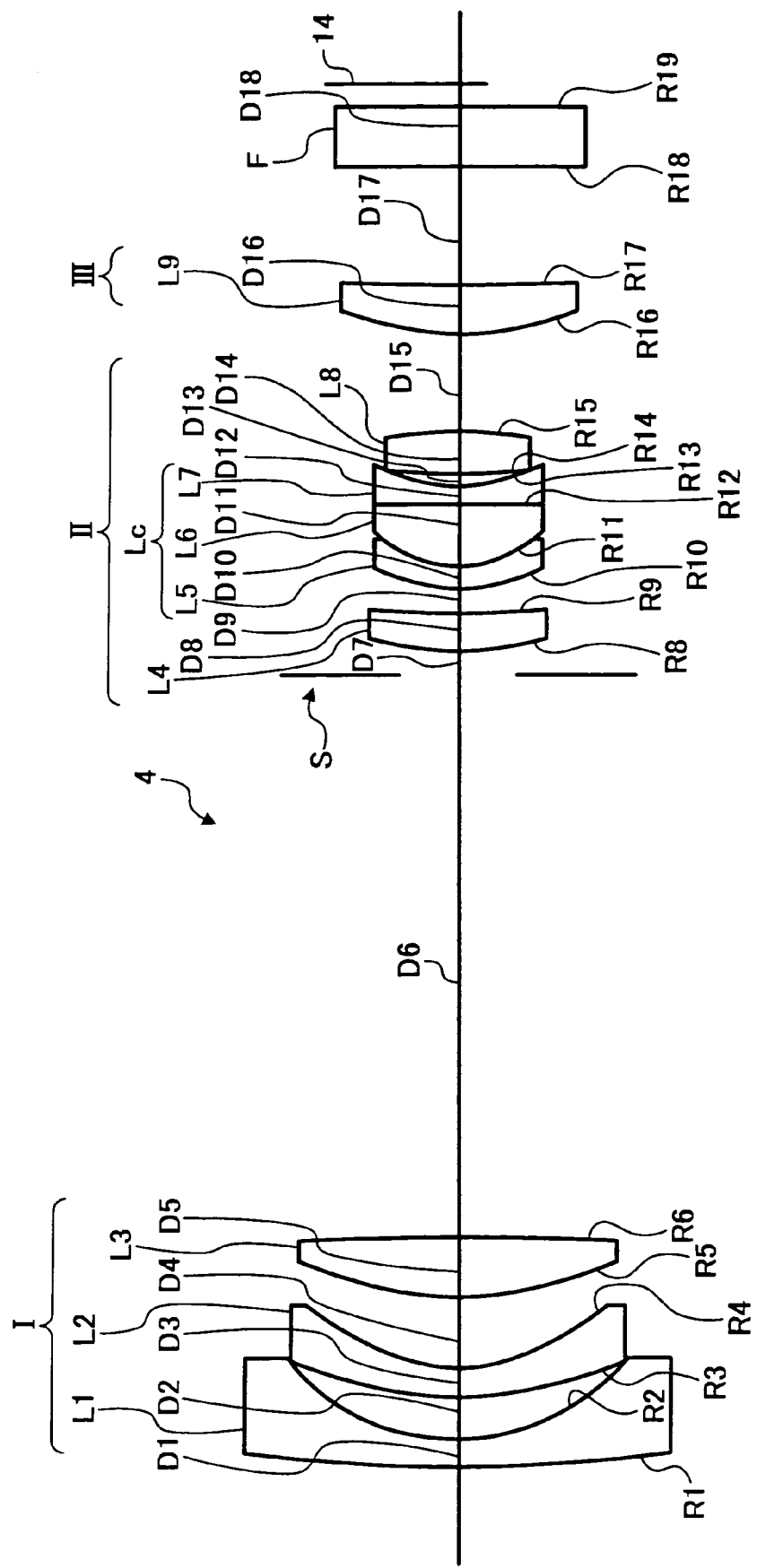
FIG. 11 is a cross-sectional view of another configurational example of the zoom lens in the electronic imaging device shown in FIGS. 1A to 1C.
Figure 12:
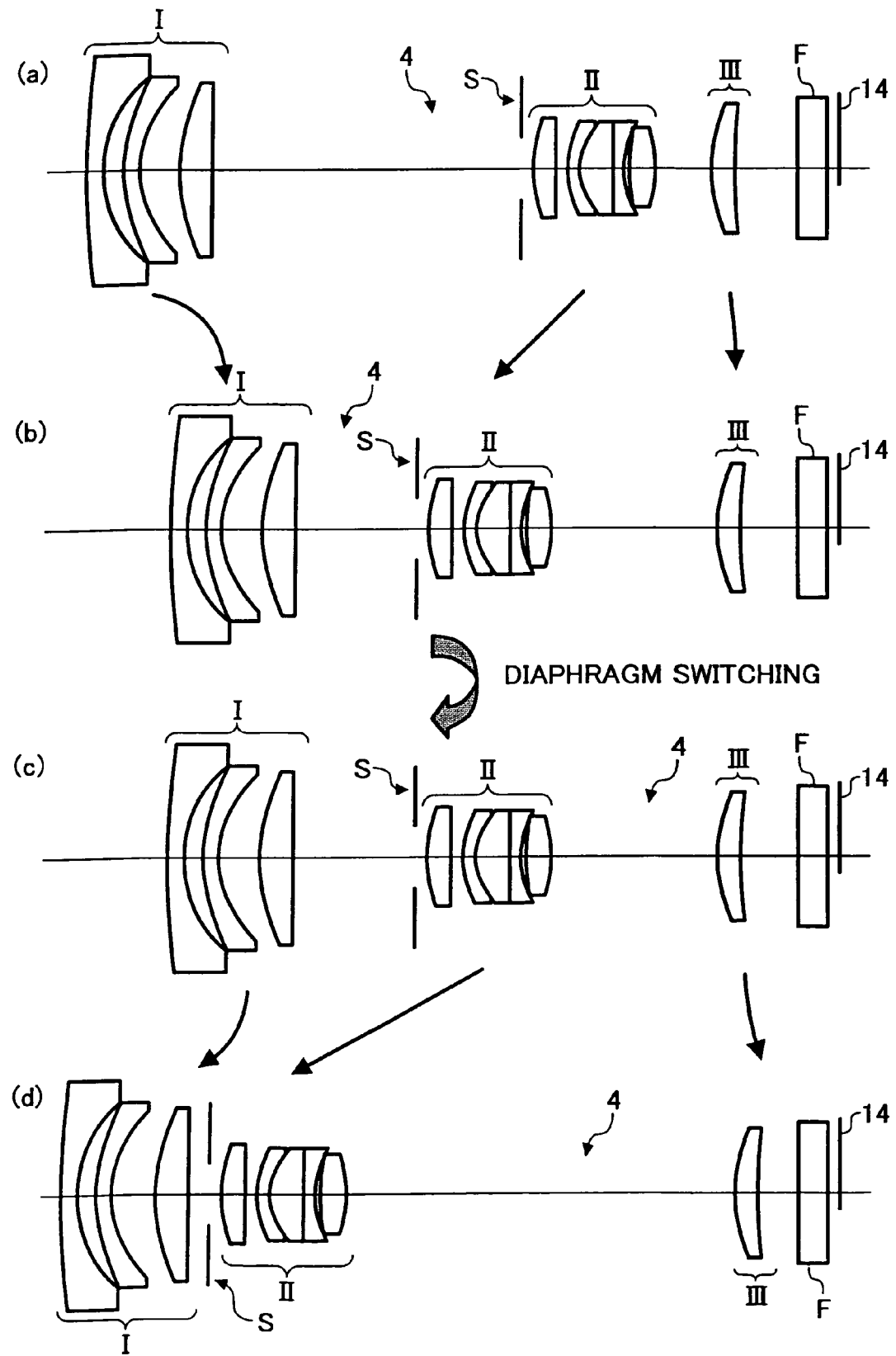
FIGS. 12A to 12D are explanatory views for a function of the zoom lens shown in FIG. 11.

In the first example, the four lenses L1 to L4 compose the first lens group I of the zoom lens 4, and the four lenses L5 to L8 compose the second lens group II thereof. However, the present invention is not always limited to the example. As shown in FIG. 11, for example, three lenses may compose the first lens group I, and five lenses may compose the second lens group II.

In FIG. 11, the first lens group I includes the first and the second lenses L1 and L2 which are negative lenses and the third lens L3 which is a positive lens in this order. The second lens group II includes the fourth and the fifth lenses L4 and L5 which are negative lenses, the sixth lens L6 which is a positive lens, the seventh lens L7 which is a negative lens, and the eighth lens L8 which is a positive lens. The diaphragm unit S is equal in configuration to that explained in the first example.

Reference symbol R1 denotes the front refracting surface of the first lens L1, and R2 denotes the rear refracting surface thereof. R3 denotes the front refracting surface of the second lens L2, and R4 denotes the rear refracting surface thereof. R5 denotes the front refracting surface of the third lens L3, R6 denotes the rear refracting surface thereof.

Reference symbol R8 denotes the front refracting surface of the fourth lens L4, and R9 denotes the rear refracting surface thereof. R10 denotes the front refracting surface of the fifth lens L5, R11 denotes bonded surfaces (refracting surfaces) of the fifth lens L5 and the sixth lens L6. R12 denotes bonded surfaces (refracting surfaces) of the sixth lens L6 and the seventh lens L7, and R13 denotes the rear refracting surface of the seventh lens L7. R14 denotes the front refracting surface of the eighth lens L8, and R15 denotes the rear refracting surface thereof.

Reference symbol R16 denotes the front refracting surface of the ninth lens L9, and R17 denotes the rear refracting surface thereof. R18 denotes the front surface of the filter F, and R19 denotes the rear surface thereof.

Reference symbol D1 denotes the distance between the refracting surfaces R1 and R2 of the first lens L1, and D2 denotes the distance between the refracting surface R2 of the first lens L1 and the refracting surface R3 of the second lens L2. D3 denotes the distance between the refracting surfaces R3 and R4 of the second lens L2, and D4 denotes the distance between the refracting surface R4 of the second lens L2 and the refracting surface R5 of the third lens L3. D5 denotes the distance between the refracting surfaces R5 and R6 of the third lens L3.

Reference symbol D6 denotes the distance between the refracting surface R6 of the third lens L3 and the diaphragm unit S, and D7 denotes the distance between the diaphragm unit S and the refracting surface R8 of the fourth lens L4.

Reference symbol D8 denotes the distance between the refracting surfaces R8 and R9 of the fourth lens L4, and D9 denotes the distance between the refracting surface R9 of the fourth lens L4 and the refracting surface R10 of the fifth lens L5. D10 denotes the distance between the refracting surface R10 of the fifth lens L5 and the bonded surfaces (refracting surfaces) R11 of the fifth lens L5 and the sixth lens L6. D1 denotes the distance between the bonded surfaces (refracting surfaces) R11 of the fifth lens L5 and the sixth lens L6 and the bonded surfaces (refracting surfaces) R12 of the sixth lens L6 and the seventh lens L7. D13 denotes the distance between the refracting surface R13 of the seventh lens L7 and the refracting surface R14 of the eighth lens L8, and D14 denotes the distance between the refracting surfaces R14 and R15 of the eighth lens L8.

Reference symbol D15 denotes the distance between the refracting surface R15 of the eighth lens L8 and the refracting surface R16 of the ninth lens L9. D16 denotes the distance between the refracting surfaces R16 and R17 of the ninth lens L9, and D17 denotes the distance between the refracting surface R17 of the ninth lens L9 and the refracting surface (front surface) R18 of the filter F. D18 denotes the distance between the refracting surface (front surface) R18 and the refracting surface (rear surface) R19 of the filter F.

In the second modification, movement of the first lens group I to the third lens group III is controlled as shown in FIGS. 12A to 12D similarly to FIGS. 5A to 5D. This movement control differs from that in the first example in that when the groups are moved from FIGS. 12A to 12B, the third lens group III is moved in a direction in which the third lens group III is slightly closer to the filter F side by a cam mechanism. Since a well-known structure can be adopted for the cam mechanism, it will not be explained herein in detail. Since the other functions are same as those in the first example, they will not be explained herein.

A specific numeric example of the zoom lens 4 employed in the electronic imaging device according to the second modification shown in FIGS. 11 and 12A to 12D will be explained. In this example, the maximum image height is 4.65 millimeters similarly to the first example. As shown in FIGS. 13 to 16, aberrations of the electronic imaging device in this example are sufficiently corrected, and the electronic imaging device can correspond to the light reception element of three to six million pixels. As is obvious from the second example, by thus constituting the electronic imaging device, it is possible to ensure a quite high image quality while attaining a sufficient reduction in size.

TABLE 3

Second numeric example
f = 5.97~22.50, F = 3.61~4.92 · 3.50-5.34, ω = 39.23~11.72

| SURFACE NUMBER | R | D | $N_d$ | $v_d$ | REMARKS | |
|---|---|---|---|---|---|---|
| 01 | 72.344 | 1.20 | 1.67790 | 55.52 | FIRST LENS | |
| 02 | 9.149 | 1.89 | | | | |
| 03 | 16.868 | 1.20 | 1.80610 | 40.74 | SECOND LENS | |
| 04* | 7.391 | 3.11 | | | | FIRST GROUP |
| | | | | | THIRD LENS | |
| 05 | 15.691 | 2.61 | 1.69895 | 30.05 | | |
| 06 | −440.540 | VARIABLE (A) | | | | |
| 07 | DIAPHRAGM | 1.00 | | | | |
| 08* | 11.188 | 1.73 | 1.63400 | 37.34 | FOURTH LENS | |
| 09 | 47.742 | 1.04 | | | | |
| | | | | | FIFTH LENS | |
| 10 | 7.682 | 1.00 | 1.84666 | 23.78 | | SECOND GROUP |
| | | | | | SIXTH LENS | |
| 11 | 5.028 | 2.72 | 1.48749 | 70.44 | | |
| 12 | −202.410 | 0.80 | 1.83400 | 37.34 | SEVENTH LENS | |
| 13 | 7.375 | 0.52 | | | | |
| | | | | | EIGTH LENS | |
| 14 | 30.591 | 1.90 | 1.48749 | 70.44 | | |
| 15* | −13.481 | VARIABLE (B) | | | | |
| 16* | 13.240 | 2.03 | 1.48749 | 70.44 | NINTH LENS | THIRD GROUP |
| 17 | 59.037 | VARIABLE (C) | | | | |
| 18 | ∞ | 2.47 | 1.51680 | 64.20 | VARIOUS FILTERS | |
| 19 | ∞ | | | | | |

Aspherical ssurface: the fourth surface $K = 0.0, A_4 = -3.50729 \times 10^{-4}, A_6 = -4.32572 \times 10^{-6}, A_8 = -3.55165 \times 10^{-8}, A_{10} = -3.38070 \times 10^{-9}$
$A_{12} = 8.33104 \times 10^{-11}, A_{14} = -3.38838 \times 10^{-12}, A_{16} = 3.26368 \times 10^{-14}, A_{18} = -8.80755 \times 10^{-16}$ Aspherical surface: the eighth surface $K = 0.0, A_4 = -4.65115 \times 10^{-5}, A_6 = -2.58537 \times 10^{-8}, A_8 = 1.24076 \times 10^{-8}, A_{10} = -1.37259 \times 10^{-11}$ Aspherical surface: the fifteenth surface $K = 0.0, A_4 = 1.84150 \times 10^{-5}, A_6 = -1.03849 \times 10^{-6}, A_8 = -3.32254 \times 10^{-7}, A_{10} = 4.75026 \times 10^{-9}$ Aspherical surface: the sixteenth surface $K = 0.0, A_4 = -3.42622 \times 10^{-5}, A_6 = 4.52141 \times 10^{-6}, A_8 = -2.18299 \times 10^{-7}, A_{10} = 5.89242 \times 10^{-9}$
$A_{12} = -6.18854 \times 10^{-11}$ It is noted that the numbers of the refracting surfaces each denoted by R plus number and those of the distance each denoted by D plus number correspond to the surface numbers shown in the Table 3.

TABLE 4

VARIABLE DISTANCE

| | SHORT FOCUS END f = 5.97 | MEAN FOCAL LENGTH f = 11.60 | LONG FOCUS END f = 22.50 |
|---|---|---|---|
| A | 24.695 | 9.338 | 1.485 |
| B | 4.165 | 13.107 | 29.189 |
| C | 5.127 | 4.423 | 2.913 |

Open Diaphragm Diameter
Short focus end to mean focal length (switching point)
φ5.26
Mean focal length (switching point) to long focus end
φ7.42
Numeric values of conditional equations $F_{WB} = 3.61$ $F_{max} = 5.34$ $(S_B/S_A) = 0.503$ $(f_c/(f_w \cdot f_T)^{1/2}) = 1.00$ In the second numeric example, the diaphragm A has a diameter of φ5.26, and the diaphragm B has a diameter of φ7.42. With the mean focal length as the switching point, in the short focus end-side focal length region in which the diaphragm B is effective, the F number is 3.61 to 4.92, and in the long focus end-side focal length region in which the diaphragm A is effective, the F number is 3.50 to 5.34.

In the long focus end-side focal length region, the diaphragm B can be inserted into the optical path. If the diaphragm B is inserted, the F number is 4.94 to 6.94.

If the diaphragm C having a diameter of φ3.71 is added and inserted into the optical path in the short focus end-side focal length region, the F number is 5.11 to 6.97.

Figure 13:
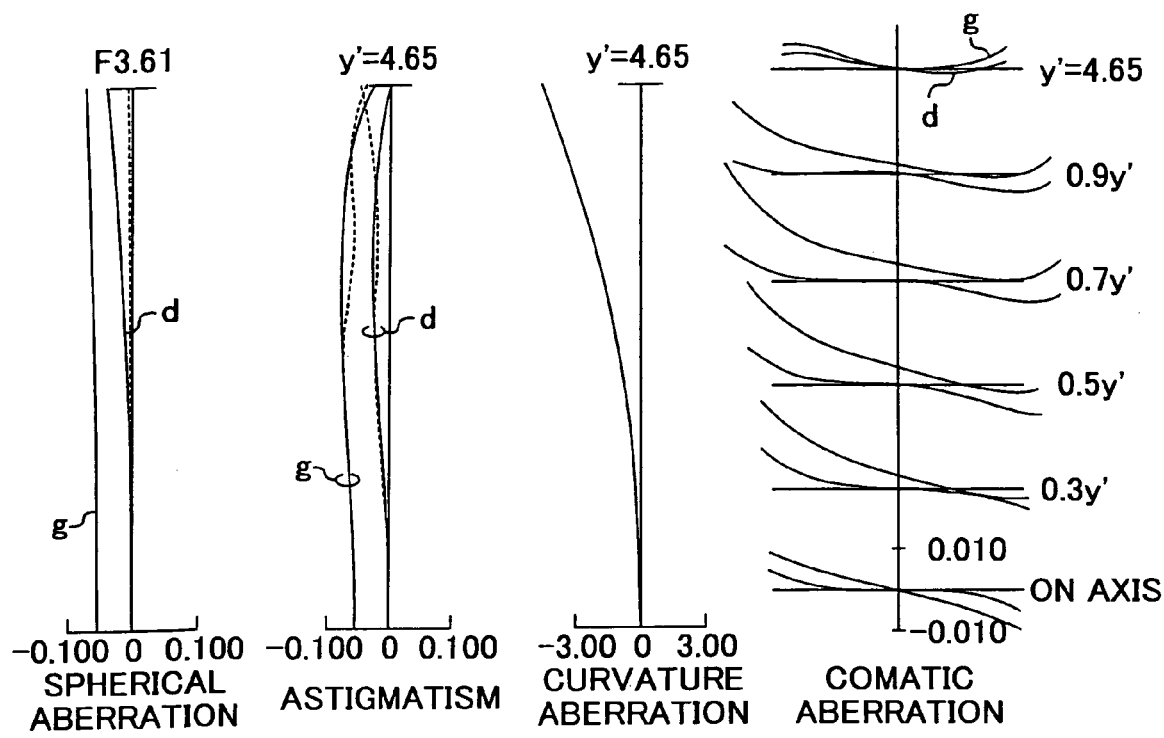
FIG. 13 depicts aberration curves on a short focus end of the zoom lens in a second numeric example.
Figure 14:
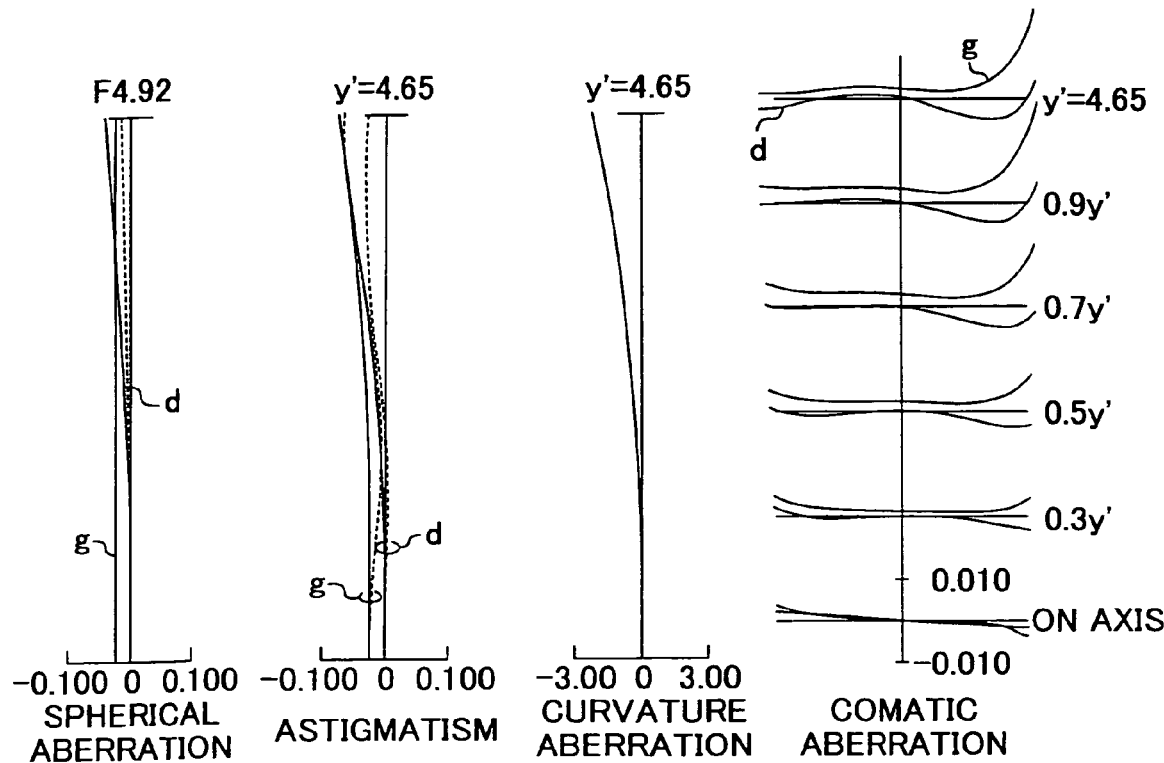
FIG. 14 depicts aberration curves on a mean focal length of the zoom lens (a diaphragm diameter of which is equal to that on the short focus end) in the second numeric example.
Figure 15:
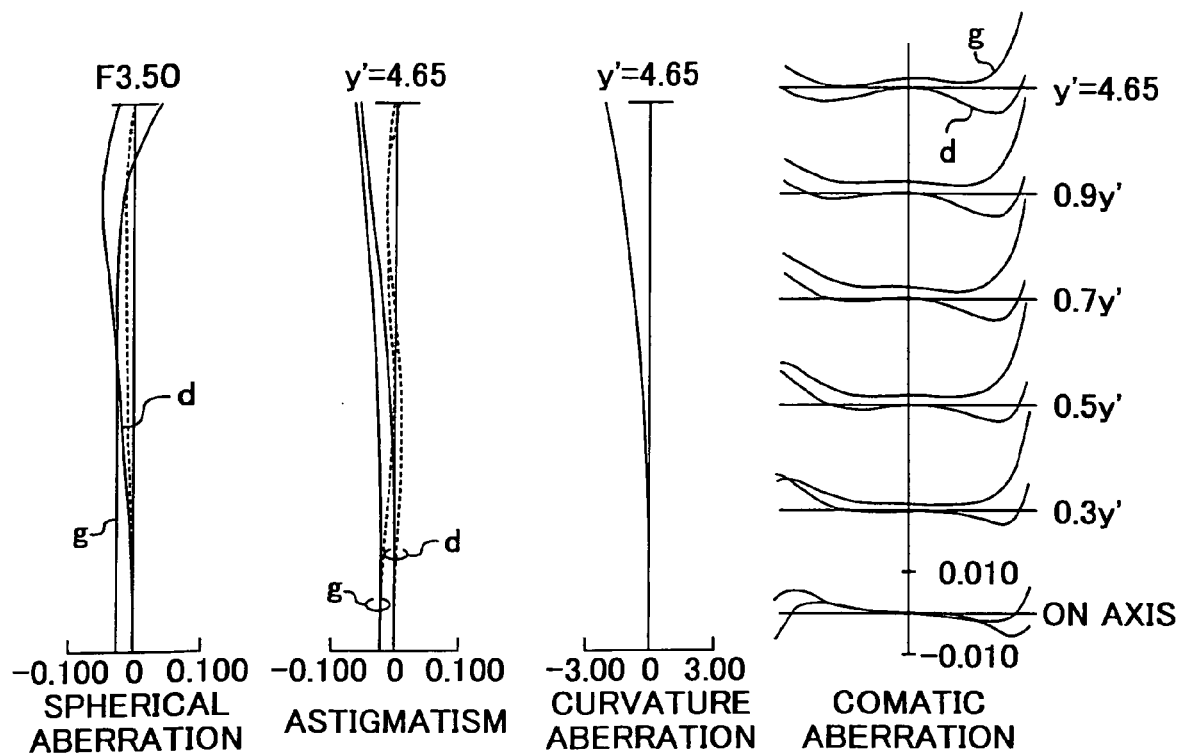
FIG. 15 depicts aberration curves on the mean focal length of the zoom lens (a diaphragm diameter of which is equal to that on a long focus end) in the second numeric example.
Figure 16:
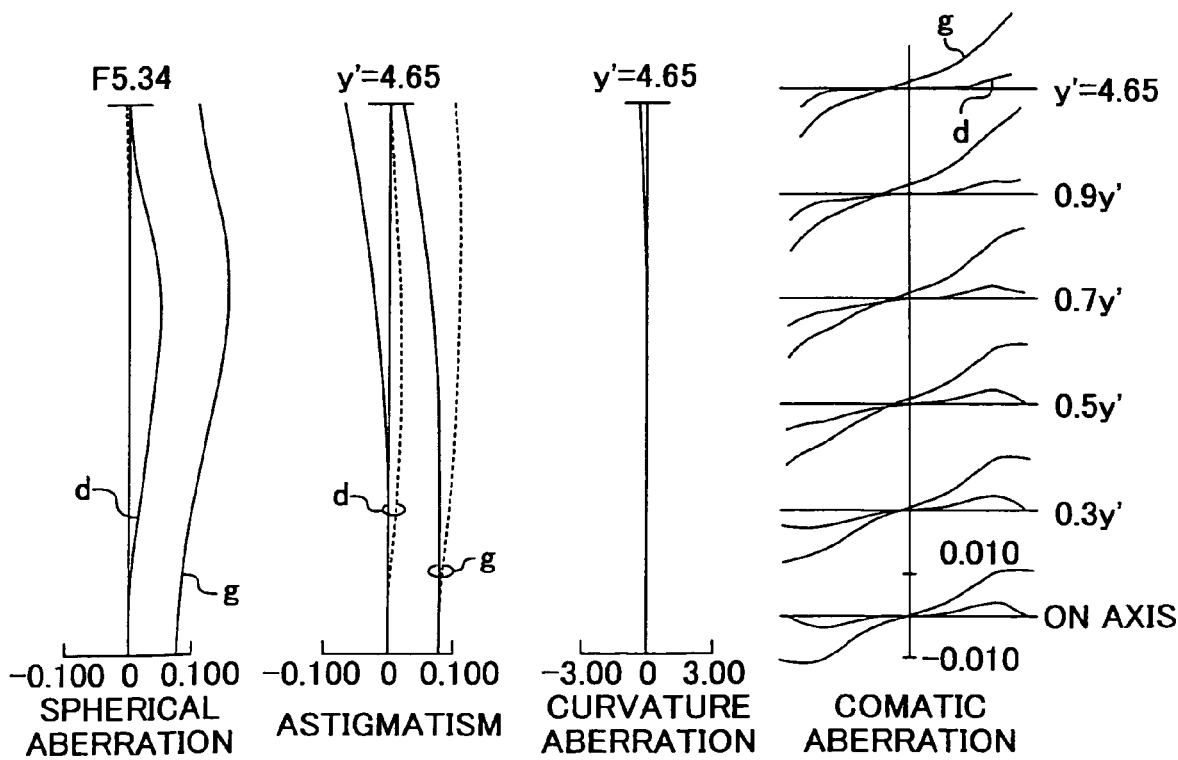
FIG. 16 depicts aberration curves on the long focus end of the zoom lens in the second numeric example.

With such lens configuration, aberrations shown in FIGS. 13 to 16 are obtained. FIG. 13 depicts aberration curves on the short focus end of the zoom lens in the second numeric example. FIG. 14 depicts aberration curves at the mean focal length of the zoom lens (the diaphragm diameter of which is equal to that on the short focus end) in the second numeric example. FIG. 15 depicts aberration curves at the mean focal length of the zoom lens (the diaphragm diameter of which is equal to that on the long focus end) in the second numeric example. FIG. 16 depicts aberration curves on the long focus end of the zoom lens in the second numeric example. In FIGS. 13 to 16, a broken line for each spherical aberration denotes a sine condition, a solid line for each astigmatism denotes a sagittal ray, and a broken line for each astigmatism denotes a meridional ray.

As explained above, the zoom lens 4 employed in the electronic imaging device according to the first embodiment includes the second lens group II that includes negative and positive lenses from the object side. If the power of the zoom lens 4 is changed from the short focus end to the long focus end, the zoom lens 4 is moved so that the second lens group II is monotonously moved from the image side to the object side, and so that the first lens group I is moved to correct the fluctuation of the position of the image surface following the variation of power. If the diaphragm (diaphragm unit S) moving integrally with the second lens group II is provided on the object side of the second lens group II, an entrance pupil can be considered a virtual image of the diaphragm aperture formed by the first lens group I.

If the aperture area of the diaphragm is set constant over the entire variable power ranges, an area of the entrance pupil gradually increases according to a change in the distance between the first lens group I and the diaphragm when the power of the lens is changed from the short focus end to the long focus end. However, since a change ratio is lower than the variable power ratio, the F number on the long focus end is naturally greater than that on the short focus end. Actually, at the variable power ratio of three, if the F number is 2.8 on the short focus end, the F number is often about 4.5 to 5.2 on the long focus end.

If the F number is small (the lens is bright), it is difficult to correct the various aberrations, resulting in a deterioration in image quality, an increase in the size of the lens, a cost increase, and the like. If the F number is great (the lens is dark), the various aberrations can be satisfactorily corrected. However, if the F number exceeds a limit, the resolution is deteriorated by a diffraction phenomenon. Recently, the size of the imaging element that converts the optical image into the electric image is particularly, increasingly reduced. The imaging element having even a pitch between the pixels of less than 2.5 micrometers is present, and a spatial frequency at which a response is necessary is as high as 200 cycles/mm. Therefore, the disadvantage of the deterioration in resolution caused by the diffraction phenomenon tends to be conspicuous.

If the variable power ratio is set higher than 3 while the aperture area of the diaphragm is set constant over the entire variable power ranges, then a fluctuation in F number when the power is changed from the short focus end to the long focus end is higher, and the following disadvantage arises. If the F number on the short focus end is set to be great to some extent so as to facilitate aberration correction, then the F number on the long focus end is extremely great, and the resolution is deteriorated by the diffraction phenomenon. If the F number on the long focus end is set small to some extent so as not to cause the deterioration in resolution by the diffraction phenomenon, then the F number on the short focus end is extremely small, making it difficult to correct the aberrations.

Particularly if the angle of view of the zoom lens of this type is to be widened, then it is necessary to apply a strong power to the first lens group I and the zoom lens has a configuration of a strong retrofocus lens type as a whole. With this configuration, it is difficult to correct the aberrations. With this configuration, if the F number is small on the short focus end, it is first difficult to correct the spherical aberration and the comatic aberration. In addition, since a focal depth is small, it is necessary to further suppress an image surface curvature which tends to increase if the angle of view is widened. For the entire zoom lens, quite a highly accurate aberration correction is required, thereby disadvantageously increasing the number of constituent lenses and increasing the size of the lens system.

Therefore, an object of the first embodiment is to obtain the electronic imaging device that can solve the conventional disadvantages, widen the angle of view so as to have a half angle of view of 38 degrees or more, and attain a higher variable power ratio of 3.5 or more with a relatively small and simple configuration, using the zoom lens 4 including the negative and positive two groups arranged from the object side in this order.

Namely, the electronic imaging device according to the first embodiment of the present invention is constituted so that if the diaphragm includes diaphragms A and B for which two discrete aperture areas can be selected, respectively, and the aperture area of the diaphragm A is larger than the aperture area of the diaphragm B (A>B), then the diaphragms A and B are controlled to be driven so that the diaphragm B is effective on a short focus end of the zoom lens 4, and so that the diaphragm A is effective on a long focus end of the zoom lens 4 (a first aspect of the present invention).

With this configuration, the electronic imaging device that includes the zoom lens having the variable power ratio of 3.5 or more while being sufficiently small in size and sufficiently wide in angle of view can be provided. Therefore, the digital camera (portable information terminal device) small in size, wide in angle of view, and high in variable power can be realized.

In addition, such configuration and control enable preventing the F number from being excessively small on the short focus end, and from being excessively large on the long focus end. Therefore, the balance between the difficulty of the aberration correction and the influence of the diffraction phenomenon can be kept, and the zoom lens small in size, wide in angle of view, and high in variable power can be designed.

Further, the selection of the aperture area of the diaphragm is made not continuous but discrete, thereby making it possible to simplify the diaphragm mechanism and simplify control over the diaphragm mechanism.

In order to make the electronic imaging device according to the present invention more suited for the wider angle of view and the higher variable power, it is preferable that the following conditional expressions are satisfied $F_{WB} > 3.0$ $F_{max} < 11$ $0.25 < (S_B/S_A) < 0.75$, where the $F_{WB}$ indicates an F number on the short focus end on which the diaphragm B is effective, the $F_{max}$ indicates a maximum F number in an entire variable power range, the $S_B$ indicates the aperture area of the diaphragm B, and the $S_A$ indicates the aperture area of the diaphragm A (a second aspect of the present invention).

With this configuration, the electronic imaging device that includes the zoom lens small in size with high performance and suitable for the wider angle of view and the higher variable power can be provided. Therefore, the digital camera (portable information terminal device) wider in angle of view, and higher in variable power can be realized.

If the $F_{WB}$ is 3.0 or less, it is difficult to correct the aberrations on the short focus end, and the size of the electronic imaging device cannot be sufficiently reduced. If the $F_{max}$ is 11 or more, the disadvantage of the deterioration in resolution due to the diffraction phenomenon occurs, and the sufficiently high image quality cannot be attained. If $(S_B/S_A)$ is 0.75 or more, it is impossible to sufficiently prevent the F number from being excessively small on the short focus end and from being excessively large on the long focus end. If $(S_B/S_A)$ is 0.25 or less, the F number is undesirably, excessively small or large in the mean variable power range.

Desirably, an upper limit of the $F_{WB}$ is 5.6 and a lower limit of the $F_{max}$ is 4.5 in light of the balance of the F number in the entire variable power ranges. If the following conditional expressions are satisfied, this is more advantageous for the improvement in performance and the reduction in size $$3.5 < F_{WB} < 5.6$$

$$4.5 < F_{max} < 8$$

$$0.35 < (S_B/S_A) < 0.65.$$

As a specific diaphragm mechanism, it is desirable that the diaphragms A and B are composed by a plurality of light shield members (the first diaphragm plate 17 and the second diaphragm plate 18) having substantially circular apertures different in diameter, respectively, and that by inserting or separating the light shield members (the first diaphragm plate 17 and the second diaphragm plate 18) into or from the optical path, the effective diaphragm is selected (a third aspect of the present invention). With this configuration, in specifically carrying out the invention, the simple and small-sized mechanism can be provided. Therefore, the digital camera (portable information terminal device) smaller in size can be realized at a lower cost.

Other examples of the diaphragm mechanism include a so-called iris diaphragm composed by many blades, and a turret having a plurality of apertures different in size arranged on a circumference. However, the iris diaphragm is complex in structure, and the turret is not suitable for the reduction in size of the electronic imaging device.

In the electronic imaging device according to the first embodiment of the present invention, it suffices that at least two apertures are selectable. Therefore, if the electronic imaging device is constituted, for example, so that the diaphragm A is inserted into the optical path and made immovable, and so that only the diaphragm B can be inserted or separated into or from the optical path proximately with the diaphragm A, the diaphragm B can be driven only by the simple actuator such as the electromagnetic plunger. Therefore, the small-sized, low-cost mechanism can be realized.

In order to further reduce the change of the F number in the entire variable power ranges without complicating the mechanism, it is desirable that a short focus end-side focal length region in which the diaphragm B is effective, and a long focus end-side focal length region in which the diaphragm A is effective are provided, and that the following conditional expression is satisfied $$0.75 < (f_c/(f_w \cdot f_T)^{1/2}) < 1.25$$

where the $f_w$ indicates the focal length on the short focus end, the $f_T$ indicates the focal length on the long focus end, and the $f_c$ indicates the focal length serving as a switching point between the short focus end-side focal length region and the long focus end-side focal length region (a fourth aspect of the present invention). With this configuration, in specifically carrying out the invention, means for further reducing the change of the F number in the entire variable power ranges can be provided. Therefore, the digital camera (portable information terminal device) free from insufficient resolution due to residual aberrations caused by the excessively small F number, the insufficient resolution due to the diffraction phenomenon caused by the excessively large F number, or the like can be realized.

If $(f_c/(f_w \cdot f_T)^{1/2})$ is 0.75 or less, the change of the F number in the long focus end-side focal length region in which the diaphragm A is effective is large. If $(f_c/(f_w \cdot f_T)^{1/2})$ is 1.25 or more, the change of the F number in the short focus end-side focal length region in which the diaphragm B is effective is large. Therefore, the both instances are not preferable.

In the long focus end-side focal length region in which the diaphragm A is effective, insertion of the diaphragm B is not always inhibited. Within the ranges which do not depart the ranges of the conditional expressions, the diaphragm B may be inserted to thereby change the F number, whereby the exposure and a depth of field can be controlled.

In the electronic imaging device according to the first embodiment of the present invention, the number of selectable aperture areas of the diaphragm is not always limited to two, but may be three or more. As explained, by adding the diaphragm having an intermediate area between the area of the diaphragm A and that of the diaphragm B, the change of the F number in the entire variable power ranges can be further reduced. In addition, within the ranges which do not depart the ranges of the conditional expressions, by adding the diaphragm having the smaller aperture area than that of the diaphragm B, the F number can be changed even in the short focus end-side focal length region in which the diaphragm B is effective.

Namely, the electronic imaging device according to the first embodiment of the present invention may be constituted so that at least two discrete aperture areas can be selected as an aperture area of the diaphragm, and so that the diaphragm is controlled so that a maximum aperture area of the diaphragm on a short focus end is smaller than the maximum aperture area on a long focus end (according to fifth to eighth aspects of the present invention).

Conditional expressions for making the electronic imaging device according to the present invention more suited for the wider angle of view and the higher variable power are as follows $$F_{Wmin} > 3.0$$

$$F_{max} < 11$$

$$0.25 < (S_W/S_T) < 0.75$$

where the $F_{Wmin}$ indicates a minimum F number on the short focus end, the $F_{max}$ indicates a maximum F number in an entire variable power range, the $S_W$ indicates the maximum aperture area of the diaphragm on the short focus end, and the $S_T$ indicates the maximum aperture area of the diaphragm on the long focus end.

With this configuration, it is possible to provide another means for realizing the electronic imaging device that includes the zoom lens having the variable power ratio of 3.5 or more while being sufficiently small in size and sufficiently wide in angle of view with high performance. Therefore, the digital camera (portable information terminal device) small in size, wide in angle of view, and high in variable power can be realized. In addition, in specifically carrying out the invention, the simple and small-sized mechanism can be provided. Therefore, the digital camera (portable information terminal device) smaller in size can be realized at a lower cost. Besides, in specifically carrying out the invention, a means for further reducing the change of the F number in the entire variable power ranges can be provided. Therefore, the digital camera (portable information terminal device) free from insufficient resolution due to residual aberrations caused by the excessively small F number, the insufficient resolution due to the diffraction phenomenon caused by the excessively large F number, or the like can be realized.

If the $F_{Wmin}$ is 3.0 or less, it is difficult to correct the aberrations on the short focus end, and the size of the electronic imaging device cannot be sufficiently reduced. If the $F_{max}$ is 11 or more, the disadvantage of the deterioration in resolution due to the diffraction phenomenon occurs, and the sufficiently high image quality cannot be attained. If $(S_W/S_T)$ is 0.75 or more, it is impossible to sufficiently prevent the F number from being excessively small on the short focus end and from being excessively large on the long focus end. If $(S_W/S_T)$ is 0.25 or less, the F number is undesirably, excessively small or large in the mean variable power range.

Desirably, an upper limit of the $F_{Wmin}$ is 5.6 and a lower limit of the $F_{max}$ is 4.5 in light of the balance of the F number in the entire variable power ranges. If the following conditional expressions are satisfied, this is more advantageous for the improvement in performance and the reduction in size $3.5 < F_{wmin} > 5.6$ $4.5 < F_{max} < 8$ $0.35 < (S_W/S_T) < 0.65$ Although the present invention is sufficiently characterized by the configuration explained so far, conditions for ensuring more preferable performance and function by the electronic imaging device will next be explained.

It is desirable that the first lens group I of the zoom lens 4 includes two negative lenses and one positive lens, and the second lens group II includes two positive lenses and one negative lens (a ninth aspect of the present invention). With this configuration, the electronic imaging device that includes the zoom lens exerting a higher performance by more satisfactorily correcting the aberrations can be provided. Therefore, the high-definition digital camera (portable information terminal device) which can acquire a high-contrast image can be realized.

As already explained, the high power is required for the first lens group I so as to widen the angle of view. To do so, the first lens group I is preferably constituted to share the power between the two negative lenses. In the second lens group II that is the variable power group, the aberrations should be satisfactorily corrected independently. Therefore, the first lens group I preferably has triplet-based configuration.

More specifically, the first lens group I can be constituted as follows. The first lens group I is composed by three lenses, i.e., the negative meniscus lens L1 having a convex surface directed to the object side, the negative lens L2 having a surface of a large radius of curvature directed to the image side, and the positive lens L3 having a surface of a large radius of curvature directed to the object side from the object side in this order. The object-side surface C (refracting surface R4) of the negative lens L2 is aspherical. By thus constituting the first lens group I, the image surface curvature can be reduced. In addition, by making the surface (refracting surface R4) having a wide refraction angle of an off-axial ray aspherical, the curvature aberrations on the short focus end can be particularly suppressed.

The second lens group II can be constituted as follows. The second lens group II is composed by the three lenses, i.e., the positive lens having a surface of a large radius of curvature directed to the object side, the negative lens having a surface of a large radius of curvature directed to the image side, and the positive lens, as well as the positive lens closest to the image side from the object side in this order. Namely, the second lens group II can be composed by a total of four or five lenses, and the surface nearest to the object side and the surface nearest to the image side can be made aspherical.

As shown in FIG. 11, for example, the second lens group II can be constituted to arrange the three lenses, i.e., the positive lens L4 having the surface of the large radius of curvature directed to the object side, the negative lens L5 having the surface of the large radius of curvature directed to the image side, and the positive lens L6, as well as the positive lens L8 closest to the image side from the object side or the lens L7 in this order. Namely, the second lens group II can be composed by a total of four or five lenses, and the surface (refracting surface R8) nearest to the object side and the surface (refracting surface R15) nearest to the image side can be made aspherical.

Besides, by dividing the image-side positive power closely related to the correction of the off-axial aberrations to the two lenses L4 and L8, a flexibility is improved and the off-axial aberrations can be satisfactorily corrected. Further, by using the aspherical two surfaces (refracting surfaces R8 and R15) as the surface (refracting surface R8) nearest to the object side and the surface (refracting surface R15) nearest to the image side, which surfaces differ in manner of causing rays to pass, respectively, the respective aspherical surfaces exhibit sufficiently different advantages for the aberration correction. The flexibility of the aberration correction can be thereby significantly improved.

In order to make extinction of a periphery of an image plane sufficiently inconspicuous, it is desirable that the electronic imaging device is constituted so that the zoom lens 4 is composed by the first lens group I having the negative focal length, the second lens group II having the positive focal length, and the third lens group III having the positive focal length from the object side in this order (a tenth aspect of the present invention). With this configuration, the electronic imaging device that includes the zoom lens higher in performance for which a sufficient exit pupil length is secured can be provided. Therefore, the high-definition digital camera (portable information terminal device) free from insufficient quantity of peripheral light while ensuring the wide angle of view can be realized.

The addition of the positive third lens group III facilitates securing the exit pupil length, and enables setting an incident angle of a peripheral luminous flux on the imaging element 14 to be sufficiently small. Therefore, occurrence of a shading resulting from a microlens of the imaging element 14 can be suppressed.

Desirably, the third lens group III is composed by the positive lens having a surface of a large radius of curvature directed to the object side, and the third lens group III includes at least one aspherical surface. With this configuration, the off-axial aberrations such as the astigmatism can be more satisfactorily corrected while minimizing a thickness of the third lens group III. The third lens group III may be fixed in changing the power of the zoom lens. However, by slightly moving the third lens group III, the flexibility of the aberration correction can be improved.

If the third lens group III is additionally arranged, it is preferable that focusing on an object having a finite length is made by moving the third lens group III (an eleventh aspect of the present invention). With this configuration, the electronic imaging device that includes the zoom lens which can realize the focusing on the object having a finite length using a simple mechanism can be provided. Therefore, the small-sized, power-saving digital camera (portable information terminal device) which can make quick focusing can be realized.

By moving the first lens group I, the focusing on the image can be made. However, because of the wider angle of view, the first lens group I includes many constituent lenses and a mass of the first lens group I tends to be large. By moving the third lens group III having fewer constituent lenses and a smaller mass than the first lens group I, an energy required for movement can be advantageously reduced. In addition, since the third lens group III is independent of the variable power group, a relatively simple mechanism can be used for the focusing.

Moreover, the electronic imaging device according to the present invention may include, as means for reducing the quantity of light while preventing the deterioration in resolution due to the diffraction phenomenon, a transmittance changing unit (transmittance change member) by the insertion or separation of the ND filter or the like may be added.

A second embodiment of the present invention will be explained with reference to FIGS. 17 and 18.

Figure 17:
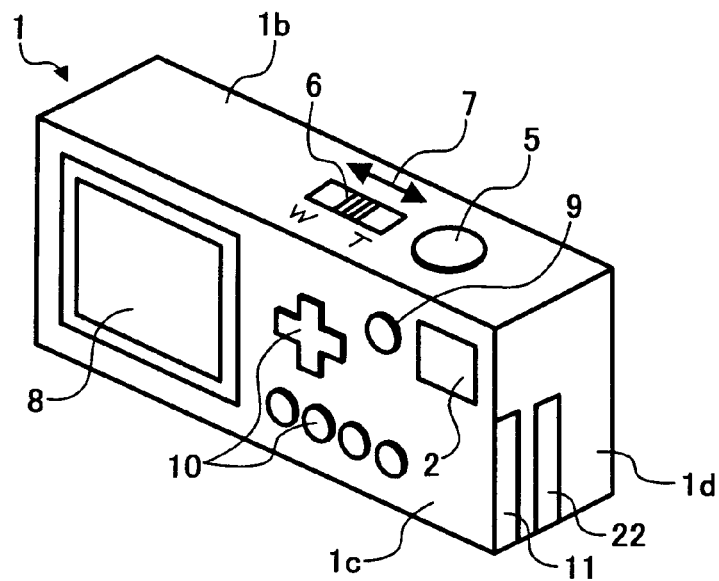
FIG. 17 is an outside view which depicts one embodiment as a portable information terminal device.
Figure 18:
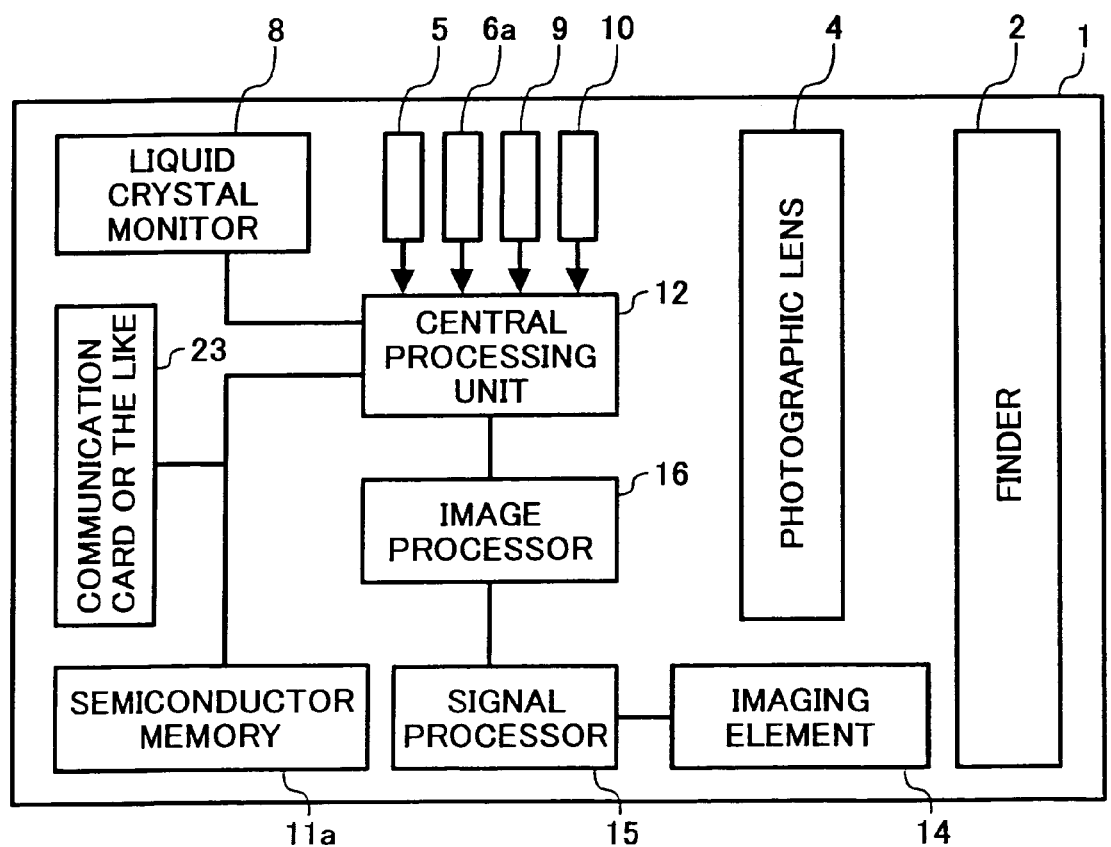
FIG. 18 is a circuit diagram of a control circuit in the portable information terminal device shown in FIG. 17.

FIGS. 17 and 18 depict an example in which a communication card slot 22 is provided in the camera body 1 of the electronic imaging device according to the first embodiment, and in which this electronic imaging device is employed as a portable information terminal device. A communication card 23 shown in FIG. 18 is detachably inserted into the communication card slot 22, by which, the communication card 23 is connected to the operational control circuit 12.

The image recorded in the memory 11a can be transmitted to an outside of the device using the communication card 23 or the like. It is noted that the memory 11a and the communication card 23 or the like are used while being inserted into dedicated or general-purpose slots, respectively.

As the portable information terminal device, the electronic imaging device that includes the zoom lens 4 as the photographic lens according to the first embodiment or the second modification of the first embodiment of the present invention can be used. If so, the electronic imaging device including, as the photographic lens, the zoom lens 4 explained in the first or second numeric example can be used. By using this electronic imaging device, the high image quality, small-sized portable information terminal device using the imaging element having three to six million pixels can be realized.

Moreover, this portable information terminal device has the electronic imaging device that includes the high performance zoom lens having the variable power ratio of 3.5 or more while being sufficiently small in size and wide in angle, mounted thereon. Therefore, according to the second embodiment of the present invention, the small-sized, highly versatile portable information terminal device can be provided. Accordingly, the user can acquire various scenes and target objects as digital images using the portable information terminal device excellent in portability, and can process the images, or transmit the images to the outside of the device.

As explained so far, according to the first aspect of the present invention, the electronic imaging device that includes the zoom lens having the variable power ratio of 3.5 or more while being sufficiently small in size and sufficiently wide in angle of view with high performance can be provided. Therefore, the digital camera (portable information terminal device) small in size, wide in angle of view, and high in variable power can be realized.

According to the second aspect of the present invention, the electronic imaging device that includes the zoom lens small in size and suitable for the wider angle of view and the higher variable power ratio with high performance can be provided. Therefore, the digital camera (portable information terminal device) wider in angle of view, and higher in variable power can be realized.

According to the third aspect of the present invention, in specifically carrying out the first and the second aspects of the present invention, the simple and small-sized mechanism can be provided. Therefore, the digital camera (portable information terminal device) smaller in size can be realized at a lower cost.

According to the fourth aspect of the present invention, in specifically carrying out the first to the third aspects of the present invention, means for further reducing the change of the F number in the entire variable power ranges can be provided. Therefore, the digital camera (portable information terminal device) free from insufficient resolution due to residual aberrations caused by the excessively small F number, the insufficient resolution due to the diffraction phenomenon caused by the excessively large F number, or the like can be realized.

According to the fifth aspect of the present invention, it is possible to provide another means for realizing the electronic imaging device that includes the zoom lens having the variable power ratio of 3.5 or more while being sufficiently small in size and sufficiently wide in angle of view with high performance. Therefore, the digital camera (portable information terminal device) small in size, wide in angle of view, and high in variable power can be realized.

According to the sixth aspect of the present invention, in specifically carrying out the fifth aspect of the present invention, the simple and small-sized mechanism can be provided. Therefore, the digital camera (portable information terminal device) smaller in size can be realized at a lower cost.

According to the seventh aspect of the present invention, in specifically carrying out the fifth and the sixth aspects of the present invention, a means for further reducing the change of the F number in the entire variable power ranges can be provided. Therefore, the digital camera (portable information terminal device) free from insufficient resolution due to residual aberrations caused by the excessively small F number, the insufficient resolution due to the diffraction phenomenon caused by the excessively large F number, or the like can be realized.

According to the ninth aspect of the present invention, the electronic imaging device that includes the zoom lens exerting higher performance by more satisfactorily correcting the aberrations can be provided. Therefore, the high-definition digital camera (portable information terminal device) which can acquire a high-contrast image can be realized.

According to the tenth aspect of the present invention, the electronic imaging device that includes the zoom lens higher in performance in which a sufficient exit pupil length is secured can be provided. Therefore, the high-definition digital camera (portable information terminal device) free from insufficient quantity of peripheral light while ensuring the wide angle of view can be realized.

According to the eleventh aspect of the present invention, the electronic imaging device that includes the zoom lens which can realize the focusing on the object having a finite length using a simple mechanism can be provided. Therefore, the small-sized, power-saving digital camera (portable information terminal device) which can make quick focusing can be realized:

According to the twelfth aspect of the present invention, the portable information terminal device has the electronic imaging device that includes the zoom lens having the variable power of 3.5 or more while being sufficiently small in size and sufficiently wide in angle of view with high performance mounted thereon. Therefore, the small-sized, highly versatile portable information terminal device can be provided. Accordingly, the user can acquire various scenes and target objects as digital images using the portable information terminal device excellent in portability, and can process the images, or transmit the images to the outside of the device.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An electronic imaging device, comprising:
a zoom lens that includes a plurality of lens groups, and is configured to change a magnification by changing a distance between the lens groups; and
an imaging element configured to convert an optical image formed by the zoom lens into an electric signal, wherein the zoom lens includes
a first lens group having a negative focal length and a second lens group having a positive focal length sequentially from an object side, and
a diaphragm on the object side of the second lens group, the diaphragm includes at least a first diaphragm having an aperture size A and a second diaphragm having an aperture size B, where $0.25 < (B/A) < 0.75$,
an aperture area of the diaphragm is controlled according to a focal length of the zoom lens,
the diaphragm is configured to be controlled such that the first diaphragm is effective when the zoom lens is on a long focus end, and the second diaphragm is effective when the zoom lens is on a short focus end,
a first focal length region for the long focus end and a second focal length region for the short focus end are provided, and $$0.75 < (f_C/(f_W \cdot f_T)^{1/2}) < 1.25,$$

where $f_T$ is the first focal length, $f_W$ is the second focal length, and $f_C$ is a focal length serving as a switching point between the first focal length region in which the first diaphragm is effective and the second focal length region in which the second diaphragm is effective.

2. The electronic imaging device according to claim 1, wherein $$F_{WB} > 3.0, \text{ and}$$

$$F_{max} < 11,$$

where $F_{WB}$ is an F number on the short focus end, and $F_{max}$ is a maximum F number in an entire magnification range.

3. The electronic imaging device according to claim 1, wherein
the first diaphragm and the second diaphragm are formed of a plurality of light shield members having substantially circular apertures of different diameter, respectively, and
an effective diaphragm is selected by inserting or removing the light shield members into or from an optical path.

4. The electronic imaging device according to claim 1, wherein the diaphragm moves integrally with the second lens group.

5. The electronic imaging device according to claim 1, wherein the first lens group includes two negative lenses and one positive lens, and the second lens group includes two positive lenses and one negative lens.

6. The electronic imaging device according to claim 1, wherein the zoom lens includes a third lens group having a positive focal length in an order of the first lens group, the second lens group, and the third lens group from the object side.

7. The electronic imaging device according to claim 6, wherein focusing on an object in a finite distance is made by moving the third lens group.

8. An electronic imaging device, comprising:
a zoom lens that includes a plurality of lens groups, and is configured to change a magnification by changing a distance between the lens groups; and
an imaging element configured to convert an optical image formed by the zoom lens into an electric signal, wherein the zoom lens includes
a first lens group having a negative focal length and a second lens group having a positive focal length sequentially from an object side, and
a diaphragm on the object side of the second lens group, the diaphragm includes at least two discrete aperture sizes, an aperture area of the diaphragm is controlled according to a focal length of the zoom lens,
the diaphragm is configured to be controlled so that a first maximum aperture size of the diaphragm on a long focus end is greater than a second maximum aperture size of the diaphragm on a short focus end, $$f_{Wmin} > 3.0,$$

$$F_{max} < 11,$$

$$0.25 < (S_W/S_T) < 0.75,$$

where $f_{Wmin}$ is a minimum F number on the short focus end, $F_{max}$ is a maximum F number in an entire magnification range, $S_W$ is the second maximum aperture size, and $S_T$ is the first maximum aperture size,
a first focal length region for the long focus end and a second focal length region for the short focus end are provided, and $$0.75 < (f_C/(f_W \cdot f_T)^{1/2}) < 1.25,$$

where $f_T$ is the first focal length, $f_W$ is the second focal length, and $f_C$ is a focal length serving as a switching point between the first focal length region in which the first diaphragm is effective and the second focal length region in which the second diaphragm is effective.

9. The electronic imaging device according to claim 8, wherein
the diaphragm includes a plurality of light shield members having substantially circular apertures of different diameter, respectively, and
an aperture size of the diaphragm is selected by inserting or removing the light shield members into or from an optical path.

10. The electronic imaging device according to claim 8, wherein the diaphragm moves integrally with the second lens group.

11. The electronic imaging device according to claim 8, wherein
the first lens group includes two negative lenses and one positive lens, and
the second lens group includes two positive lenses and one negative lens.

12. The electronic imaging device according to claim 8, wherein the zoom lens includes a third lens group having a positive focal length in an order of the first lens group, the second lens group, and the third lens group from the object side.

13. The electronic imaging device according to claim 12, wherein focusing on an object in a finite distance is made by moving the third lens group.

14. A mobile information terminal, comprising:
an electronic imaging device including
a zoom lens that includes a plurality of lens groups, and is configured to change a magnification by changing a distance between the lens groups; and
an imaging element configured to convert an optical image formed by the zoom lens into an electric signal, wherein
the zoom lens includes
a first lens group having a negative focal length and a second lens group having a positive focal length sequentially from an object side, and
a diaphragm on the object side of the second lens group,
the diaphragm includes at least a first diaphragm having an aperture size A and a second diaphragm having an aperture size B, where $0.25<(B/A)<0.75$,
an aperture area of the diaphragm is controlled according to a focal length of the zoom lens,
the diaphragm is configured to be controlled such that the first diaphragm is effective when the zoom lens is on a long focus end and the second diaphragm is effective when the zoom lens is on a short focus end,
a first focal length region for the long focus end and a second focal length region for the short focus end are provided, and $$0.75<(f_C/(f_W \cdot f_T)^{1/2})<1.25,$$

where $f_T$ is the first focal length, $f_W$ is the second focal length, and $f_C$ is a focal length serving as a switching point between the first focal length region in which the first diaphragm is effective and the second focal length region in which the second diaphragm is effective.

15. A mobile information terminal, comprising:
an electronic imaging device including
a zoom lens that includes a plurality of lens groups, and is configured to change a magnification by changing a distance between the lens groups; and
an imaging element configured to convert an optical image formed by the zoom lens into an electric signal, wherein
the zoom lens includes
a first lens group having a negative focal length and a second lens group having a positive focal length sequentially from an object side, and
a diaphragm on the object side of the second lens group,
the diaphragm includes at least two discrete aperture sizes,
an aperture area of the diaphragm is controlled according to a focal length of the zoom lens,
the diaphragm is configured to be controlled so that a first maximum aperture size of the diaphragm on a long focus end is greater than a second maximum aperture size of the diaphragm on a short focus end, $$f_{Wmin} > 3.0,$$

$$F_{max} < 11,$$

$$0.25 < (S_W/S_T) < 0.75,$$

where $f_{Wmin}$ is a minimum F number on the short focus end, $F_{max}$ is a maximum F number in an entire magnification range, $S_W$ is the second maximum aperture size, and $S_T$ is the first maximum aperture size,
a first focal length region for the long focus end and a second focal length region for the short focus end are provided, and $$0.75<(f_C/(f_W \cdot f_T)^{1/2})<1.25,$$

where $f_T$ is the first focal length, $f_W$ is the second focal length, and $f_C$ is a focal length serving as a switching point between the first focal length region in which the first diaphragm is effective and the second focal length region in which the second diaphragm is effective.

16. An electronic imaging device, comprising:
a zoom lens that includes a plurality of lens groups, and is configured to change a magnification by changing a distance between the lens groups; and
an imaging element configured to convert an optical image formed by the zoom lens into an electric signal, wherein
the zoom lens includes
a first lens group having a negative focal length and a second lens group having a positive focal length sequentially from an object side, and
a diaphragm on the object side of the second lens group,
the diaphragm includes at least a first diaphragm having an aperture size A and a second diaphragm having an aperture size B, where A is greater than B,
an aperture area of the diaphragm is controlled according to a focal length of the zoom lens,
the diaphragm is configured to be controlled such that the first diaphragm is effective when the zoom lens is on a long focus end, and the second diaphragm is effective when the zoom lens is on a short focus end,
a first focal length region for the long focus end and a second focal length region for the short focus end are provided, and $$0.75<(f_C/(f_W \cdot f_T)^{1/2})<1.25,$$

where $f_T$ is the first focal length, $f_W$ is the second focal length, and $f_C$ is a focal length serving as a switching point between the first focal length region in which the first diaphragm is effective and the second focal length region in which the second diaphragm is effective.

* * * * *